US011438729B2

(12) United States Patent
Das et al.

(10) Patent No.: US 11,438,729 B2
(45) Date of Patent: Sep. 6, 2022

(54) REPORT IDENTIFICATION AND POWER CONTROL FOR RANGING

(71) Applicant: Intel Corporation, Santa Clara, CA (US)

(72) Inventors: Dibakar Das, Hilsboro, OR (US); Jonathan Segev, Sunnyvale, CA (US); Chittabrata Ghosh, Fremont, CA (US); Ganesh Venkatesan, Hilsboro, OR (US); Feng Jiang, Sunnyvale, CA (US); Qinghua Li, San Ramon, CA (US); Xiaogang Chen, Portland, OR (US); Eran Segev, Tel Aviv (IL); Huaning Niu, San Jose, CA (US); Shlomi Vituri, Tel Aviv (IL); Elad Oren, Tel Aviv (IL); Chen Kojokaro, Yoqneam Illit (IL)

(73) Assignee: Intel Corporation, Santa Clara, CA (US)

( * ) Notice: Subject to any disclaimer, the term of this patent is extended or adjusted under 35 U.S.C. 154(b) by 5 days.

(21) Appl. No.: 17/158,302

(22) Filed: Jan. 26, 2021

(65) Prior Publication Data

US 2021/0329410 A1    Oct. 21, 2021

Related U.S. Application Data

(63) Continuation of application No. 16/746,462, filed on Jan. 17, 2020, now Pat. No. 10,932,088.
(Continued)

(51) Int. Cl.
*H04W 4/02*      (2018.01)
*H04W 24/10*      (2009.01)
*H04W 52/24*      (2009.01)

(52) U.S. Cl.
CPC ........... *H04W 4/023* (2013.01); *H04W 24/10* (2013.01); *H04W 52/242* (2013.01); *H04W 52/245* (2013.01)

(58) Field of Classification Search
CPC ... H04W 4/023; H04W 24/10; H04W 52/242; H04W 52/245
(Continued)

(56) References Cited

U.S. PATENT DOCUMENTS 5,722,064 A    2/1998    Campana, Jr.
8,792,367 B2    7/2014    Nie et al.
(Continued)

OTHER PUBLICATIONS

"U.S. Appl. No. 16/746,462, Notice of Allowance dated Oct. 20, 2020", 14 pgs.
(Continued)

*Primary Examiner* — Nghi H Ly
(74) *Attorney, Agent, or Firm* — Schwegman Lundberg & Woessner, P.A.

(57) ABSTRACT

Methods, apparatuses, and computer readable media for report identification and power control for ranging in a wireless network are disclosed. An apparatus of a responding station (RSTA) is disclosed, where the apparatus comprises processing circuitry configured to perform ranging with a initiating stations (ISTAs) and maintain a separate sounding dialogue token for each of the ISTAs and transmit a corresponding sounding dialogue token for a ISTA in a trigger frame for ranging and sounding or a null data packet announcement (NDPA) frame, and in a responding to initiating location measurement report. Apparatuses of RSTAs and ISTAS are disclosed that perform power control management during non-trigger-based ranging.

20 Claims, 21 Drawing Sheets

Related U.S. Application Data

(60) Provisional application No. 62/875,808, filed on Jul. 18, 2019, provisional application No. 62/793,484, filed on Jan. 17, 2019, provisional application No. 62/882,684, filed on Aug. 5, 2019, provisional application No. 62/933,938, filed on Nov. 11, 2019.

(58) Field of Classification Search
USPC ............... 455/456.1, 404.2, 421, 418, 422.1
See application file for complete search history.

(56) References Cited

U.S. PATENT DOCUMENTS

| | | |
|---|---|---|
| 10,932,088 B2 | 2/2021 | Das et al. |
| 2014/0004865 A1 | 1/2014 | Bhargava et al. |
| 2016/0007164 A1 | 1/2016 | Mueck et al. |
| 2019/0014466 A1* | 1/2019 | Seok ..................... H04W 12/12 |
| 2019/0182674 A1* | 6/2019 | Li ........................ G01S 13/765 |
| 2020/0068521 A1* | 2/2020 | Fang ........................ G01S 5/14 |
| 2020/0169841 A1 | 5/2020 | Das et al. |
| 2020/0209383 A1* | 7/2020 | Amizur ............... H04W 64/003 |

OTHER PUBLICATIONS

"U.S. Appl. No. 16/746,462, Response filed Aug. 24, 20 to Restriction Requirement dated Jun. 23, 2020", 8 pgs.

"U.S. Appl. No. 16/746,462, Restriction Requirement dated Jun. 23, 2020", 7 pgs.

U.S. Appl. No. 16/746,462 U.S. Pat. No. 10,932,088, filed Jan. 17, 2020, Report Identification and Power Control for Ranging.

\* cited by examiner

FIG. 22

STA INFO FIELD 2200

| B0 B10 | B11 B16 | B17 B19 | B20 B22 | B23 B25 | B26 | B27 | B28 B30 | B31 |
|---|---|---|---|---|---|---|---|---|
| AID11/RSID11 2204 | OFFSET 2206 | R2I_N_STS 2208 | R2I REP 2210 | I2R_N_STS 2212 | RESERVED 2214 | DISAM-BIGUATION 2216 | I2R REP 2218 | RESERVED 2214 |
| 11 | 6 | 3 | 3 | 3 | 1 | 1 | 3 | 1 |

BITS 2202

FIG. 23

POWER CONTROL FIELD 2300

| B0 B5 | B6 B10 | B11 | B12 B13 | B14 B16 |
|---|---|---|---|---|
| I2R NDP TX POWER 2304 | R2I NDP TARGET RSSI 2306 | DISAM-BIGUATION 2308 | R2I NDP TARGET RSSI 2310 | RESERVED 2312 |
| 6 | 5 | 1 | 2 | 3 |

BITS 2302

RANGING PARAMETER ELEMENT 2600

| B0   B07 | B8   B15 | B16 | B17   B39 | B40   B59 | B60   B63 |
|---|---|---|---|---|---|
| SUBELEMENT ID 2604 | LENGTH 2606 | IMMEDIATE LMR FEEDBACK 2608 | MIN TIME BETWEEN MEASURE- MENTS 2610 | MAXIMUM TIME BETWEEN MEASURE- MENTS 2612 | RESERVED 2614 |
| 8 | 8 | 1 | 23 | 20 | 4 |

BITS 2602

FIG. 26

REPORT IDENTIFICATION AND POWER CONTROL FOR RANGING

PRIORITY CLAIM

This application is a continuation of U.S. patent application Ser. No. 16/746,462, filed Jan. 17, 2020, now issued as U.S. Pat. No. 10,932,088, which claims the benefit of priority under 35 USC 119(e) to U.S. Provisional Patent Application Ser. No. 62/875,808 filed Jul. 18, 2019, U.S. Provisional Patent Application Ser. No. 62/793,484, filed Jan. 17, 2019, U.S. Provisional Patent Application Ser. No. 62/882,684, filed Aug. 5, 2019, U.S. Provisional Patent Application Ser. No. 62/933,938, filed Nov. 11, 2019, which are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11az, IEEE 802.1lax, and/or IEEE 802.11 extremely high-throughput (EHT). Some embodiments relate to a mechanism to identify measurement sequences associated with a location measurement report (LMR) during trigger-based (TB) ranging. Some embodiments relate to power control for ranging sequences.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIG. 22 illustrates a STA info field of a NDPA frame, in accordance with some embodiments;

FIG. 23 illustrates power control field, in accordance with some embodiments;

FIG. 26 illustrates a ranging parameter element, in accordance with some embodiments;

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to methods, computer readable media, and apparatus for ordering or scheduling location measurement reports, traffic indication maps (TIMs), and other information during SPs. Some embodiments relate to methods, computer readable media, and apparatus for extending TIMs. Some embodiments relate to methods, computer readable media, and apparatus for defining SPs during beacon intervals (BI), which may be based on TWTs.

Figure 1:
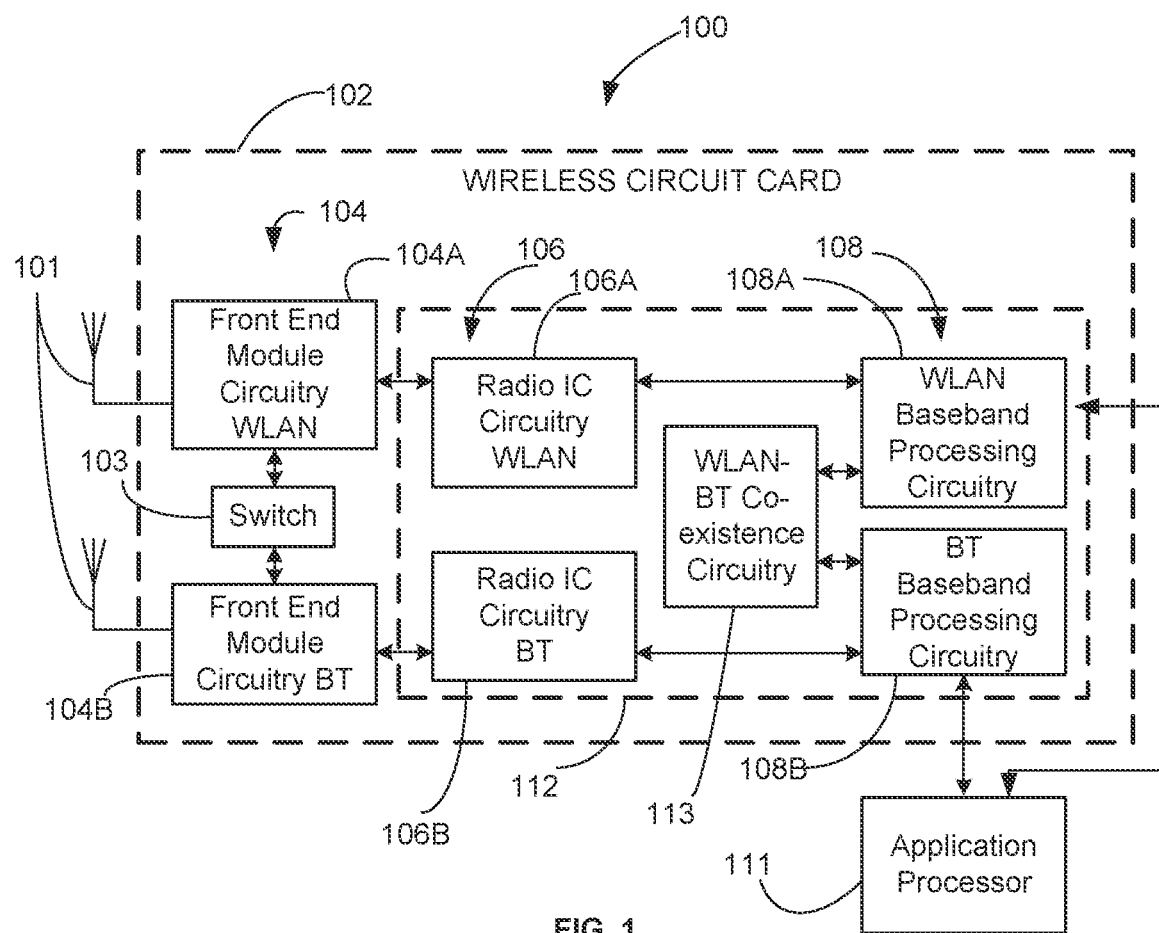
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.1 lac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.1 lax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
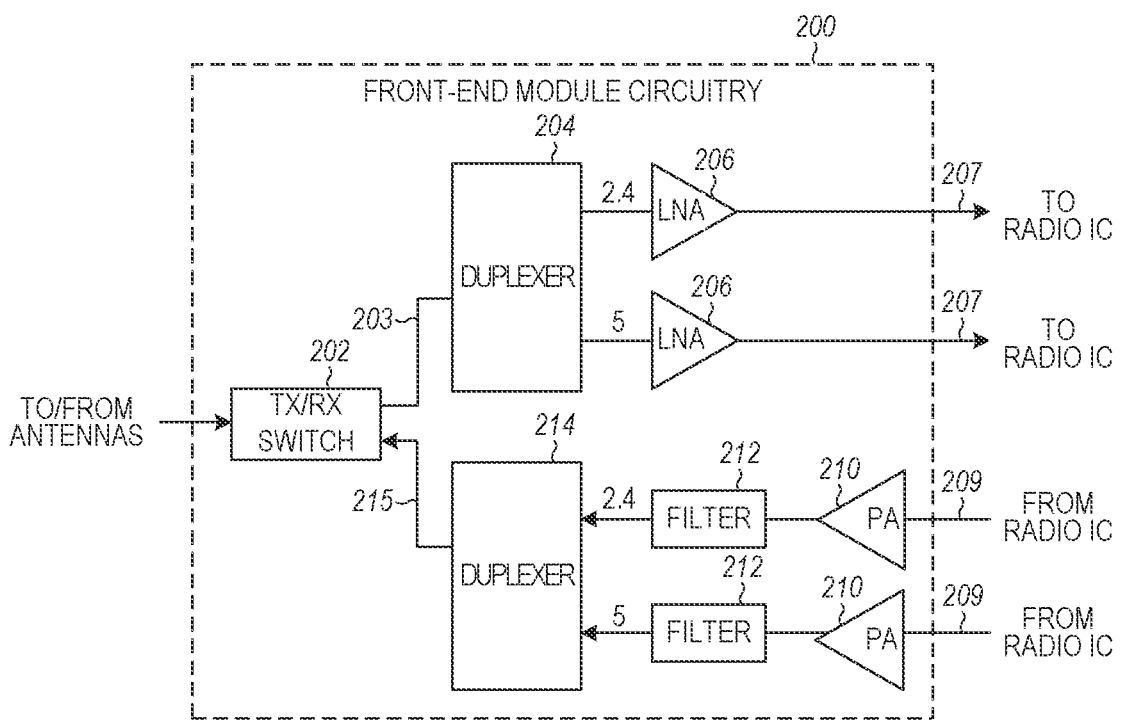
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
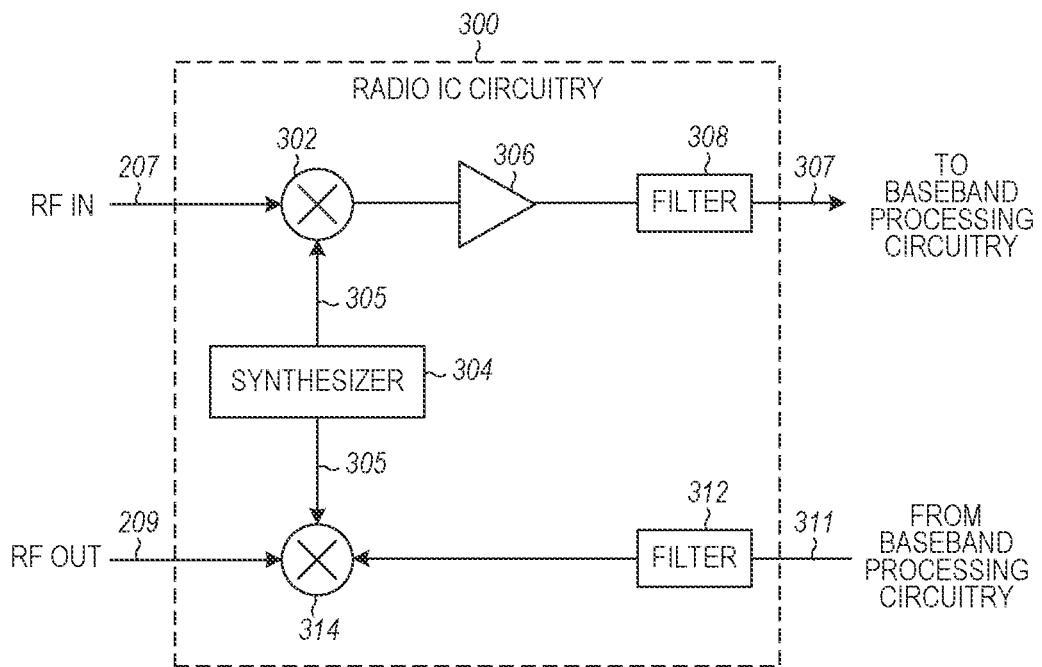
FIG. 3 illustrates a radio IC circuitry for use in the radio architecture of FIG. 1 in accordance with some embodiments.

FIG. 3 illustrates radio integrated circuit (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
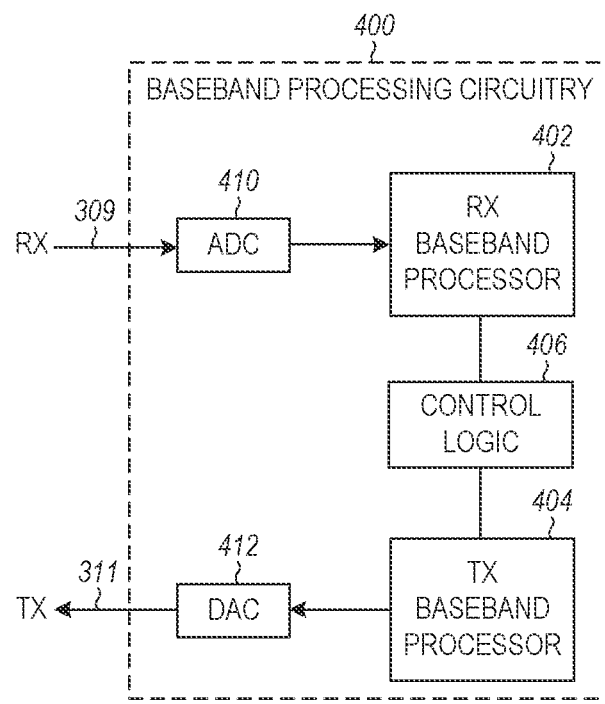
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
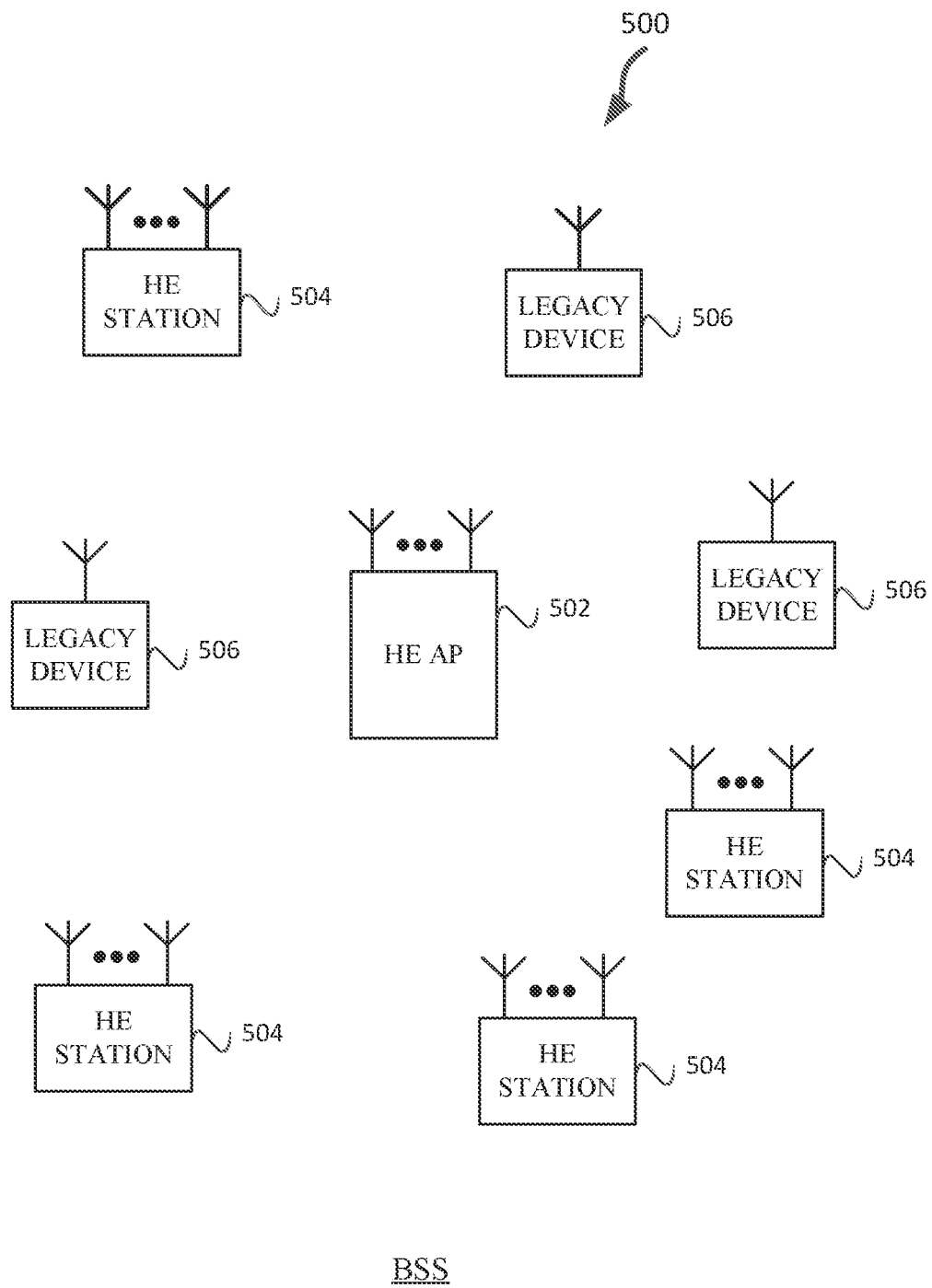
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be termed an AP, a plurality of HE (e.g., IEEE 802.1 lax) stations (STAs) 504, and a plurality of legacy (e.g., IEEE 802.11g/n/ac) devices 506. In some embodiments, the HE STAs 504 and/or HE AP 502 are configured to operate in accordance with IEEE 802.11 extremely high throughput (EHT). In some embodiments, the HE STAs 504 and/or HE AP 520 are configured to operate in accordance with IEEE 802.11 az. In some embodiments, IEEE 802.11EHT may be termed Next Generation 802.11.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.11 ax. The IEEE 802.11 protocol may be IEEE 802.11 next generation. The EHT protocol may be termed a different name in accordance with some embodiments. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one EHT AP 502 that is part of an extended service set (ESS). A controller (not illustrated) may store information that is common to the more than one HE APs 502 and may control more than one BSS, e.g., assign primary channels, colors, etc. HE AP 502 may be connected to the internet.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. In some embodiments, when the HE AP 502 and HE STAs 504 are configured to operate in accordance with IEEE 802.11EHT, the legacy devices 506 may include devices that are configured to operate in accordance with IEEE 802.11ax. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11EHT or another wireless protocol. In some embodiments, the HE STAs 504 may be termed extremely high throughput (EHT) stations or stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE or EHT frame may be configurable to have the same bandwidth as a channel. The HE or EHT frame may be a physical Layer Convergence Procedure (PLCP) Protocol Data Unit (PPDU). In some embodiments, PPDU may be an abbreviation for physical layer protocol data unit (PPDU). In some embodiments, there may be different types of PPDUs that may have different fields and different physical layers and/or different media access control (MAC) layers. For example, a single user (SU) PPDU, multiple-user (MU) PPDU, extended-range (ER) SU PPDU, and/or trigger-based (TB) PPDU. In some embodiments EHT may be the same or similar as HE PPDUs.

The bandwidth of a channel may be 20 MHz, 40 MHz, or 80 MHz, 80+80 MHz, 160 MHz, 160+160 MHz, 320 MHz, 320+320 MHz, 640 MHz bandwidths. In some embodiments, the bandwidth of a channel less than 20 MHz may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MLMO HE PPDU formats. In some embodiments, the 996-subcarrier RU is used in the 160 MHz and 80+80 MHz OFDMA and MU-MIMO HE PPDU formats.

A HE or EHT frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 20001 x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth@, low-power BlueTooth@, or other technologies.

In accordance with some IEEE 802.11 embodiments, e.g, IEEE 802.11EHT/ax embodiments, a HE AP 502 may operate as a master station which may be arranged to contend for a wireless medium (e.g., during a contention period) to receive exclusive control of the medium for a transmission opportunity (TXOP). The HE AP 502 may transmit a EHT/HE trigger frame transmission, which may include a schedule for simultaneous UL transmissions from HE STAs 504. The HE AP 502 may transmit a time duration of the TXOP and sub-channel information. During the TXOP, HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE or EHT control period, the HE AP 502 may communicate with HE stations 504 using one or more HE or EHT frames. During the TXOP, the HE STAs 504 may operate on a sub-channel smaller than the operating range of the HE AP 502. During the TXOP, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments the trigger frame may indicate an UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE or EHT TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 or IEEE 802.11EHT/ax communication techniques, although this is not a requirement.

In some embodiments the HE station 504 may be a "group owner" (GO) for peer-to-peer modes of operation. A wireless device may be a HE station 502 or a HE AP 502.

In some embodiments, the HE STA 504 and/or HE AP 502 may be configured to operate in accordance with IEEE 802.11mc. In example embodiments, the radio architecture of FIG. 1 is configured to implement the HE STA 504 and/or the HE AP 502. In example embodiments, the front-end module circuitry of FIG. 2 is configured to implement the HE STA 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-28.

In example embodiments, the HE station 504 and/or the HE AP 502 are configured to perform the methods and operations/functions described herein in conjunction with FIGS. 1-28. In example embodiments, an apparatus of the EHT station 504 and/or an apparatus of the HE AP 502 are configured to perform the methods and functions described herein in conjunction with FIGS. 1-28. The term Wi-Fi may refer to one or more of the IEEE 802.11 communication standards. AP and STA may refer to EHT/HE access point 502 and/or EHT/HE station 504 as well as legacy devices 506.

In some embodiments, a HE AP STA may refer to a HE AP 502 and/or a HE STAs 504 that is operating as a HE APs 502. In some embodiments, when a HE STA 504 is not operating as a HE AP, it may be referred to as a HE non-AP STA or HE non-AP. In some embodiments, HE STA 504 may be referred to as either a HE AP STA or a HE non-AP.

Figure 6:
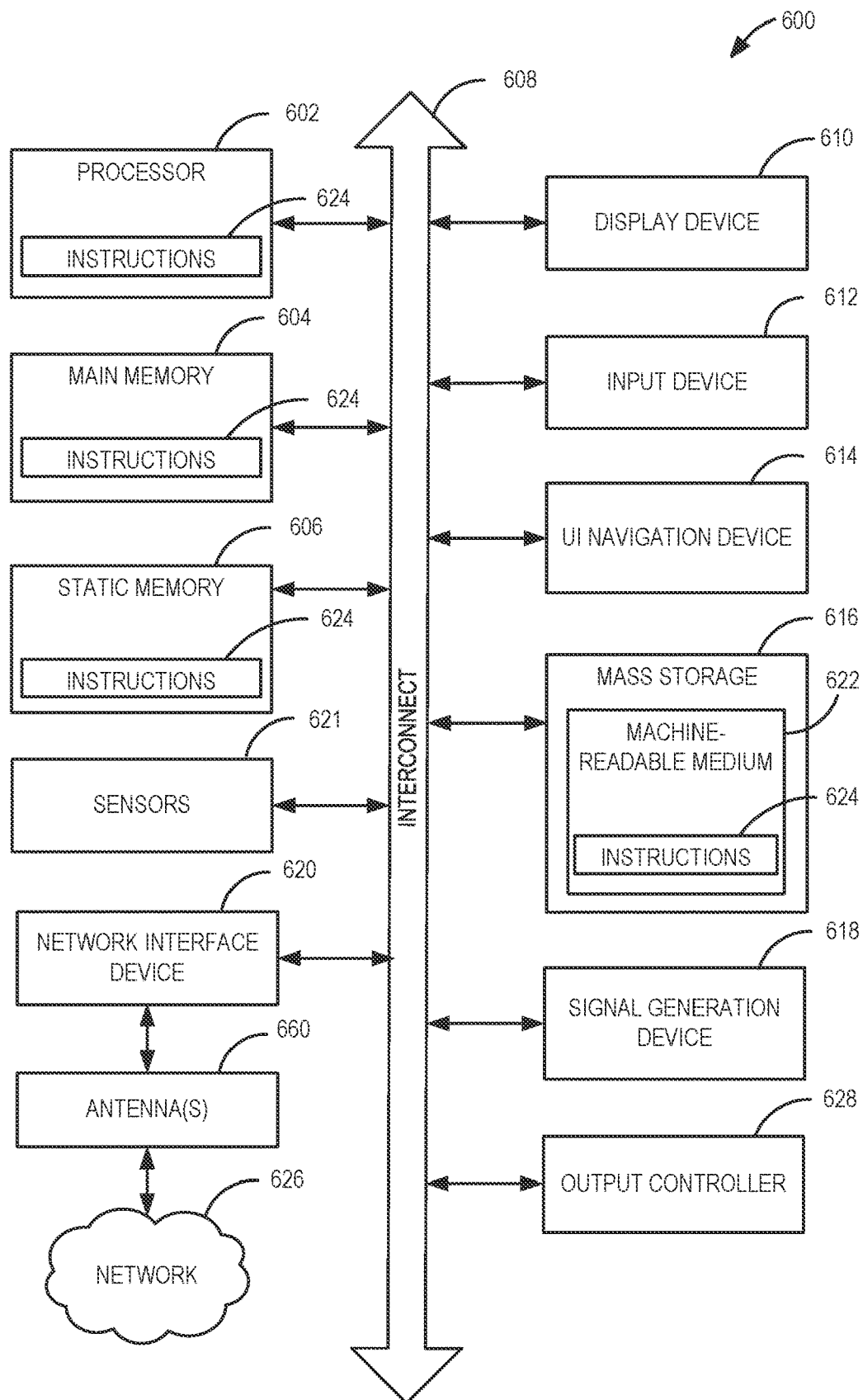
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, EVT station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
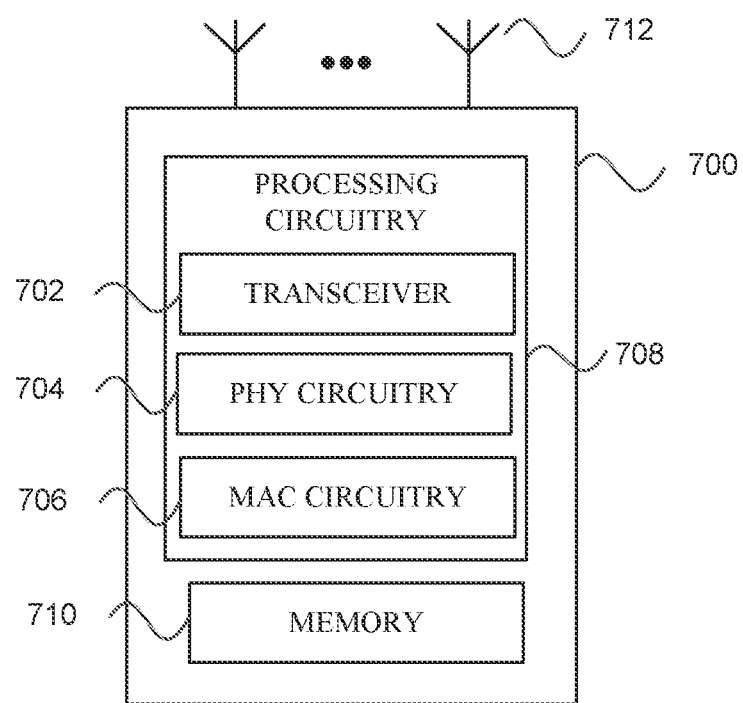
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device or HE wireless device. The wireless device 700 may be a HE STA 504, HE AP 502, and/or a HE STA or HE AP. A HE STA 504, HE AP 502, and/or a HE AP or HE STA may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Figure 8:
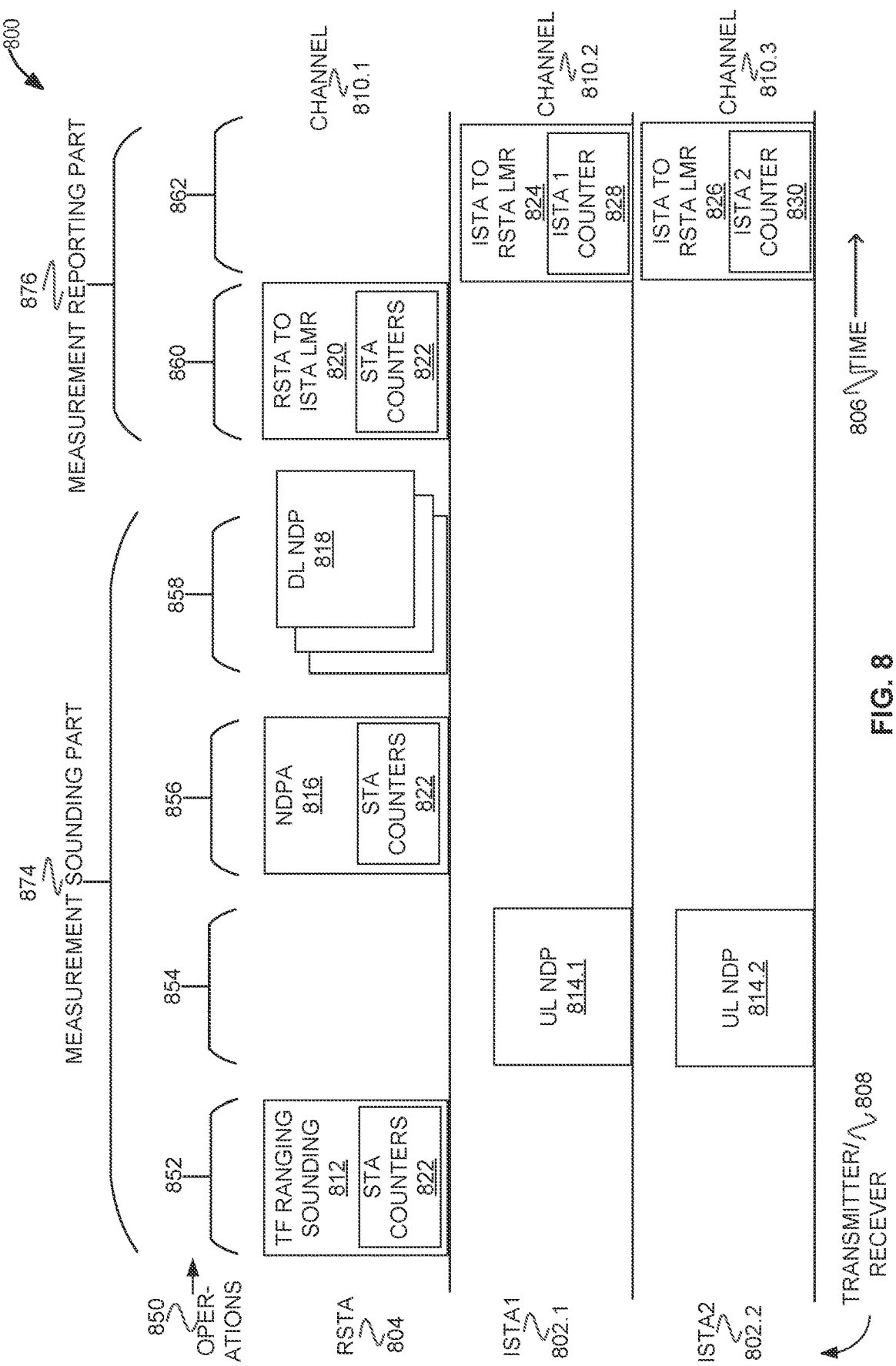
FIG. 8 illustrates a method of trigger based (TB) ranging, in accordance with some embodiments.

FIG. 8 illustrates a method 800 of trigger based (TB) ranging, in accordance with some embodiments. Illustrated in FIG. 8 is ISTA1 802.1, ISTA2 802.2, RSTA 804, time 806, transmitter/receiver 808, channels 810, TF ranging sounding 812, uplink (UL) null data packet (NDP) 814, NDP announcement (NDPA) frame 816, downlink (DL) NDP 818, RSTA to ISTA LMR 820, STA counters 822, ISTA to RSTA LMR 824, ISTA to RSTA LMR 826, ISTA 1 counter 828, ISTA 2 counter 830, operations 850, measurement sounding part 874, and measurement reporting part 876.

Time 806 indicates time along a horizontal axis. Transmitter/receiver 808 indicates the transmitter or receiver along a vertical access. ISTAs 802 may be HE STAs 504 and/or HE APs 502. RSTA 804 may be an HE STA 504 and/or an HE AP 502. Channels 810 may be channels that are used to transmit and receive the frames, e.g., PPDUs. The channels 810 may be overlapping or may be distinct. For example, the TF ranging sounding 812 may be transmitted on a 20 MHz channel (channel 810.1), and in response UL NDP 814.1 and UL NDP 814.2 may be transmitted on different spatial streams of the same 20 MHz channel. All illustrated packets may be transmitted in a same transmission opportunity, which may start at the start of a polling part. There may be a polling part before the measurement sounding part 874 where the polling part determines which ISTAs 802 to include in the TB ranging. A measurement reporting part 876 follows the range measurement 874. The method 800 may begin at operation 852 with the RSTA 804 transmitting a TF ranging sounding 812. The TF ranging sounding 812 may include STA counters 822. The TF ranging sounding 812 may be the same or similar as trigger frame 1000. TF ranging sounding 812 may refer to the trigger type subfield 1020 indicating ranging with a trigger subtype subfield 1018 indicating sounding. The STA counters 822 may be the same or similar as STA 1 sounding dialogue token 1022.1 through STA N sounding dialogue token 1022.N. The STA counters 822 may be the same or similar as STA ranging counter 918, ISTA counter, STA sounding dialogue tokens 1022, and/or STA N sounding dialogue token 1122.

In some embodiments, the TF ranging sounding 812 does not include STA counters 822. The RSTA 804 may maintain ISTA counters 822 for ISTAs 802 that are participating in ranging, which may be both TB ranging 800 and non-TB ranging. The RSTA 804 may increment the STA counters 822 for each ranging (e.g., method 800), to identify the ranging individually per ISTA 802.

The STA counters 822, which may refer to one or more of the ISTA counters, indicate a number which identifies the measurement sounding part that the TF ranging sounding frame 812, NDPA frame 816, and/or RSTA to ISTA LMR 820 is transmitted as part of for the individual ISTA 802. So that there may be measurement sounding part number associated with each ISTA.

The ISTAs 802.2 may match the ISTA counter that is included in the TF ranging sounding 812 and/or NDPA 816 (e.g., STA counters 822) with the ISTA counter in the RSTA to ISTA LMR 820 where each ISTA 802 receives a RSTA to ISTA LMR 820 that includes an ISTA counter 828 for that ISTA 802. The ISTAs 802 may determine there is an error if the ISTA counter from the RSTA 804 does not match the ISTA counter (e.g., the STA counters 822) in the RSTA to ISTA LMR 820. The RSTA 804 may increment the ISTA counters for each ranging, e.g., method 800, and wrap the value around modulus the largest number that can be represented by the ISTA counters, e.g., 64 for 8 bits. As disclosed in conjunction with FIG. 10, TF ranging sounding 812 includes user info list 1012 that includes resource units for the ISTA 802 to transmit the UL NDP 814.

The method 800 continues at operation 854 with the ISTAs 802 transmitting UL NDPs 814 in accordance with the TF ranging sounding 812. The UL NDP 814 may be NDP PPDUs. The method 800 continues at operation 856 with the RSTA 804 transmitting a NDPA frame 816. The NDPA frame 816 may include the STA counters 822 for ISTA1 802.1 and ISTA2 802.2. NDPA frame 816 may be the same or similar as ranging NDP announcement 900. The STA counters 822 may be the same or similar as STA 1 ranging counter 918.1 through STA N ranging counter 918.N.

The method 800 may continue at operation 858 with the RSTA 804 transmitting DL NDPs 818 to the ISTAs 802. The DL NDPs 818 may be transmitted on different spatial streams in accordance with the NDPA 816, e.g., as disclosed in conjunction with FIG. 9.

The method 800 continues at operation 860 with the RSTA 804 transmitting RSTA to ISTA LMRs 820 to the ISTAs 802. For example, the RSTA to ISTA LMR 820 may be the same or similar as location measurement report 1100. The RSTA to ISTA LMRs 820 may include STA counters 822 with one STA counter in each RSTA to ISTA LMR 820, in accordance with some embodiments. The STA counters 822 may be the same or similar as STA N sounding dialogue token 1122 as disclosed in conjunction with FIG. 11. RSTA to ISTA LMR 820 may include timing information for the ISTAs 802 to determine a location The method 800 continues at operation 862 with the ISTAs 804 transmitting to RSTA ISTA to RSTA LMRs 824. For example, the ISTA to RSTA LMRs 824 may be the same or similar as location measurement report 1100. The ISTA to RSTA LMRs 824 may include ISTA 1 counter 828 and ISTA and ISTA to RSTA LMR 826 may include ISTA 2 counter 830, in accordance with some embodiments. ISTA 1 counter 828 and ISTA 2 counter 830 may be the same or similar as STA N sounding dialogue token 1122 as disclosed in conjunction with FIG. 11. ISTA to RSTA LMR 824 and ISTA to RSTA LMR 826 may include timing information for RSTA 804 to determine a location. Operation 862 is optional and may be determined based on a set-up parameters. The RSTA 804 may determine there is an error if the ISTA counter included in the ISTA to RSTA LMR 824, 826 does not match a corresponding counter of the STA counters 822 for a corresponding ISTA 802.

The STA counters 822 may include the ISTA 1 counter 828 and the ISTA 2 counter 830. The STA counters 822 may be included in only one of TF ranging sounding 812 and NDPA 816, in accordance with some embodiments. There is a delay between the operations 850 which may be a short interframe space (SIFS) or another duration. The method 800 may include one or more additional operations 850. One or more of the operations 850 may be optional. STA counters 822 may refer to one or more ISTA counters, e.g., ISTA 1 counter 828 or ISTA 2 counter 830. STA counters 822 and ISTA counters may be referred to with different names, in accordance with some embodiments, e.g., as disclosed herein, e.g., STA 1 ranging counter 918.

Figure 9:
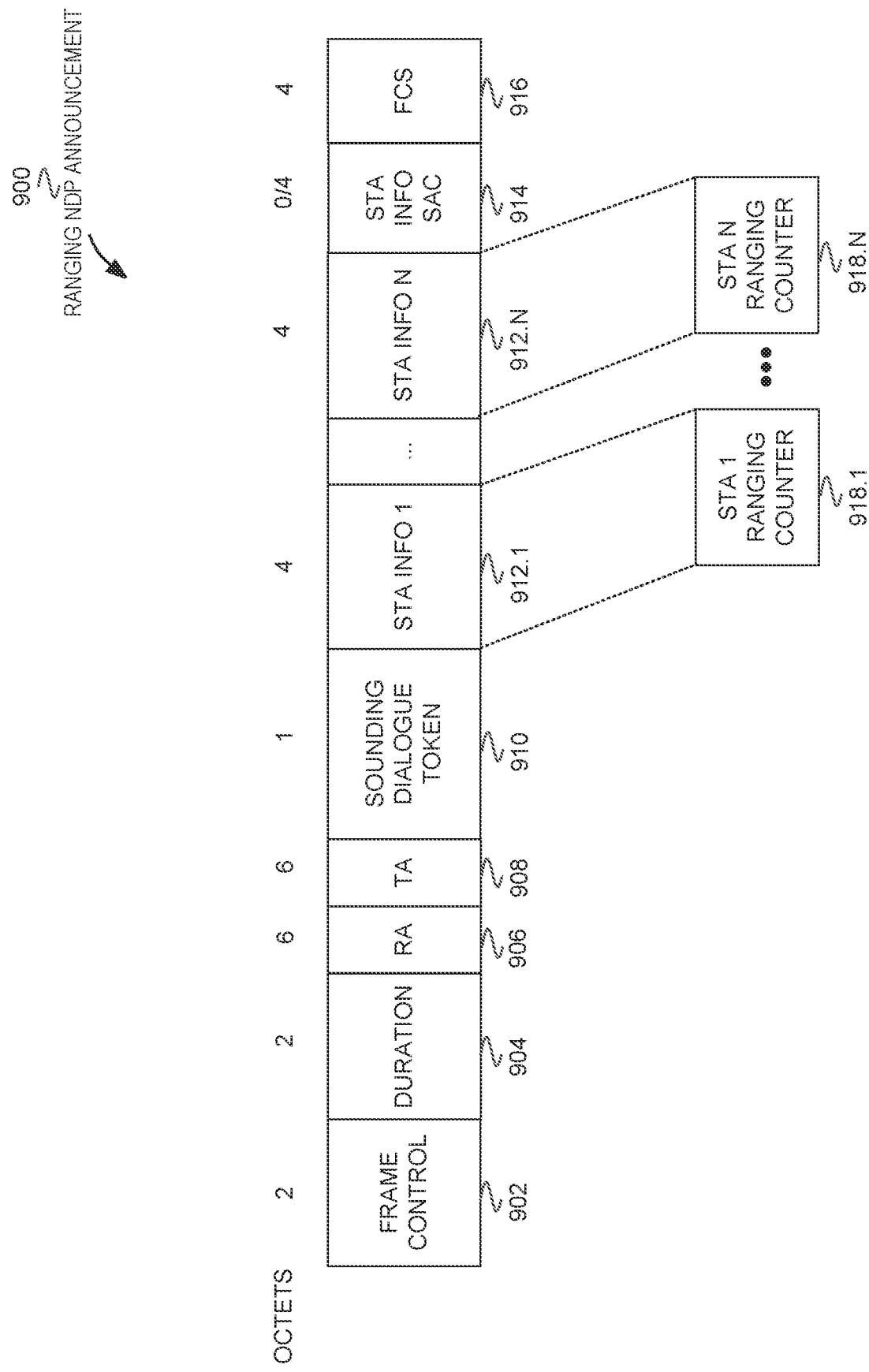
FIG. 9 illustrates a ranging NDP announcement (NDPA) frame, in accordance with some embodiments.

FIG. 9 illustrates a ranging NDP announcement (NDPA) frame 900, in accordance with some embodiments. Illustrated FIG. 9 is frame control subfield 902, duration subfield 904, receiver address (RA) subfield 906, transmitter address (TA) subfield 908, sounding dialogue token subfield 910, STA info 1 subfield 912.1 through STA info N subfield 912.N, STA info SAC subfield 914, which may be optional for secure ranging, and FCS subfield 916. The STA info 912 may include STA ranging counters 918. The STA ranging counters may be fixed number of bits to represent a ranging value, e.g., 6 to 24 bits.

The frame control subfield 902 indicates VHT NDP announcement in accordance with some embodiments. The duration subfield 904, RA subfield 906, TA subfield 908 may be set in accordance with a VHT NDP announcement frame in accordance with IEEE 802.11.

The sounding dialogue token subfield 910 contains a value of 0 to 63, which identifies the measurement sounding part that this ranging NDPA frame 900 is transmitted as part of.

The STA info 1 subfield 912.1 through STA info N subfield 912.N may include an AID11/RSID11 indicating an ISTA, an offset, an R2I N_STS, R2I Rep, I2R N_STS, disambiguation, and I2R rep. The STA info 1 subfield 912.1 through STA info N subfield 912.N may indicate a STA ranging counter 918. The STA ranging counter 918 may be the same or similar as STA counters 822, ISTA counter, STA sounding dialogue tokens 1022, and/or STA N sounding dialogue token 1122. The STA ranging counters 918 may be a fixed number of bits, e.g., 4 to 24 bits, and indicate a measurement sounding part for a corresponding ISTA that is indicated in the STA info 912. One or more of the subfields of NDPA frame 900 may be optional. NDPA frame 900 may include one or more additional subfields.

Figure 10:
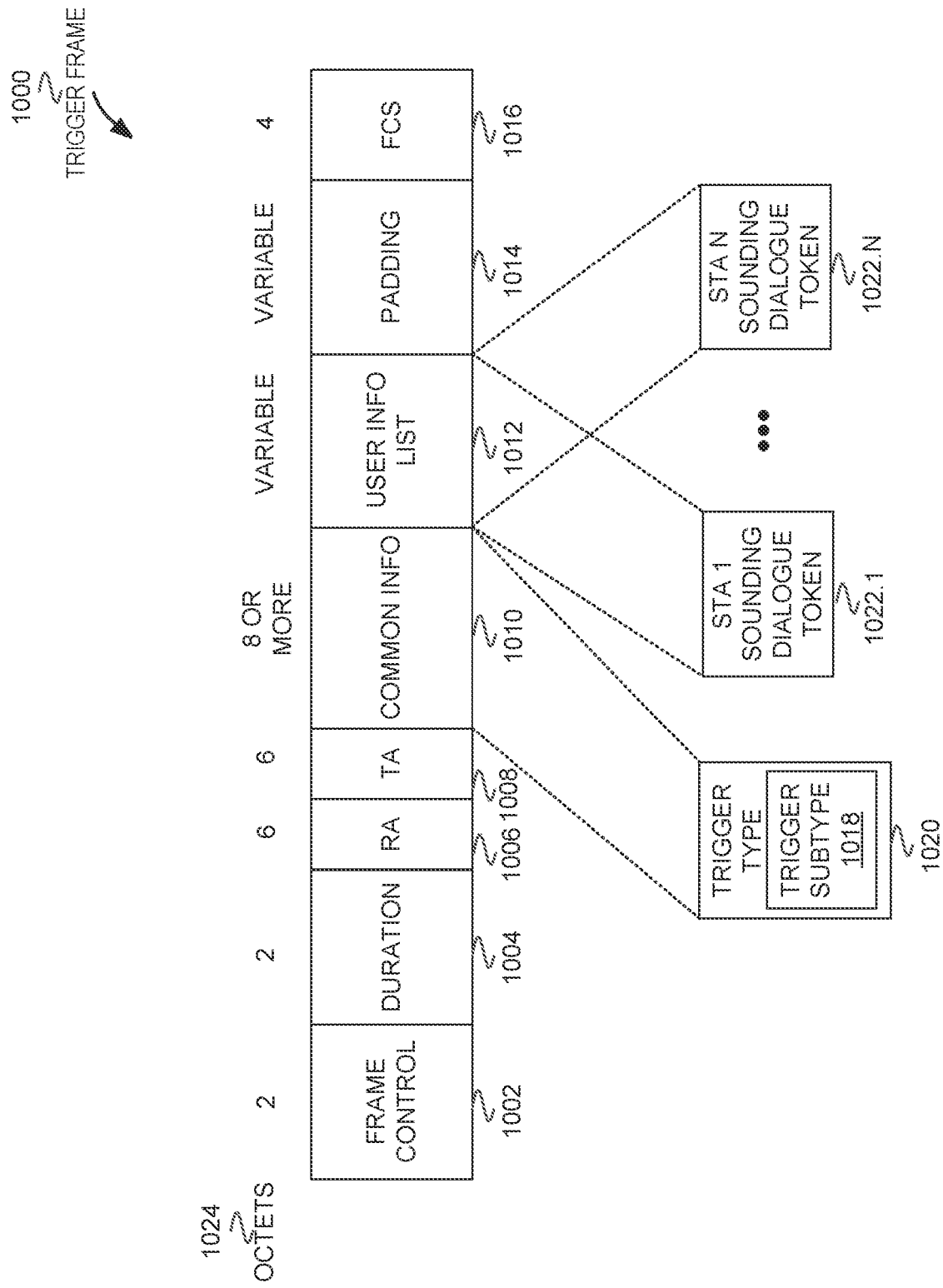
FIG. 10 illustrates a trigger frame (TF), in accordance with some embodiments.

FIG. 10 illustrates a trigger frame (TF) 1000, in accordance with some embodiments. Trigger frame 1000 may include frame control subfield 1002, duration subfield 1004, RA subfield 1006, TA subfield 1008, common information (info) 1010, user info list 1012, padding subfield 10, and FCS 1016. Octets 1024 indicates a number of octets of the subfields, in accordance with some embodiments.

The common info 1010 may include a trigger type 1020 that may indicate a trigger subtype 1018. The user info list 1012 may include subfields for each ISTA where one of the subfields is STA sounding dialogue token 1022. The STA sounding dialogue token 1022 may be a fixed number of bits, e.g., 4 to 24 bits, and indicate a measurement sounding part for a corresponding ISTA that is indicated in the STA info subfields of the user info list 1012. STA sounding dialogue token 1022 may be the same or similar as STA N sounding dialogue token 1122, STA ranging counter 918, and/or ISTA counter 828. One or more of the subfields of TF 1000 may be optional. TF 1000 may include one or more additional subfields.

Figure 11:
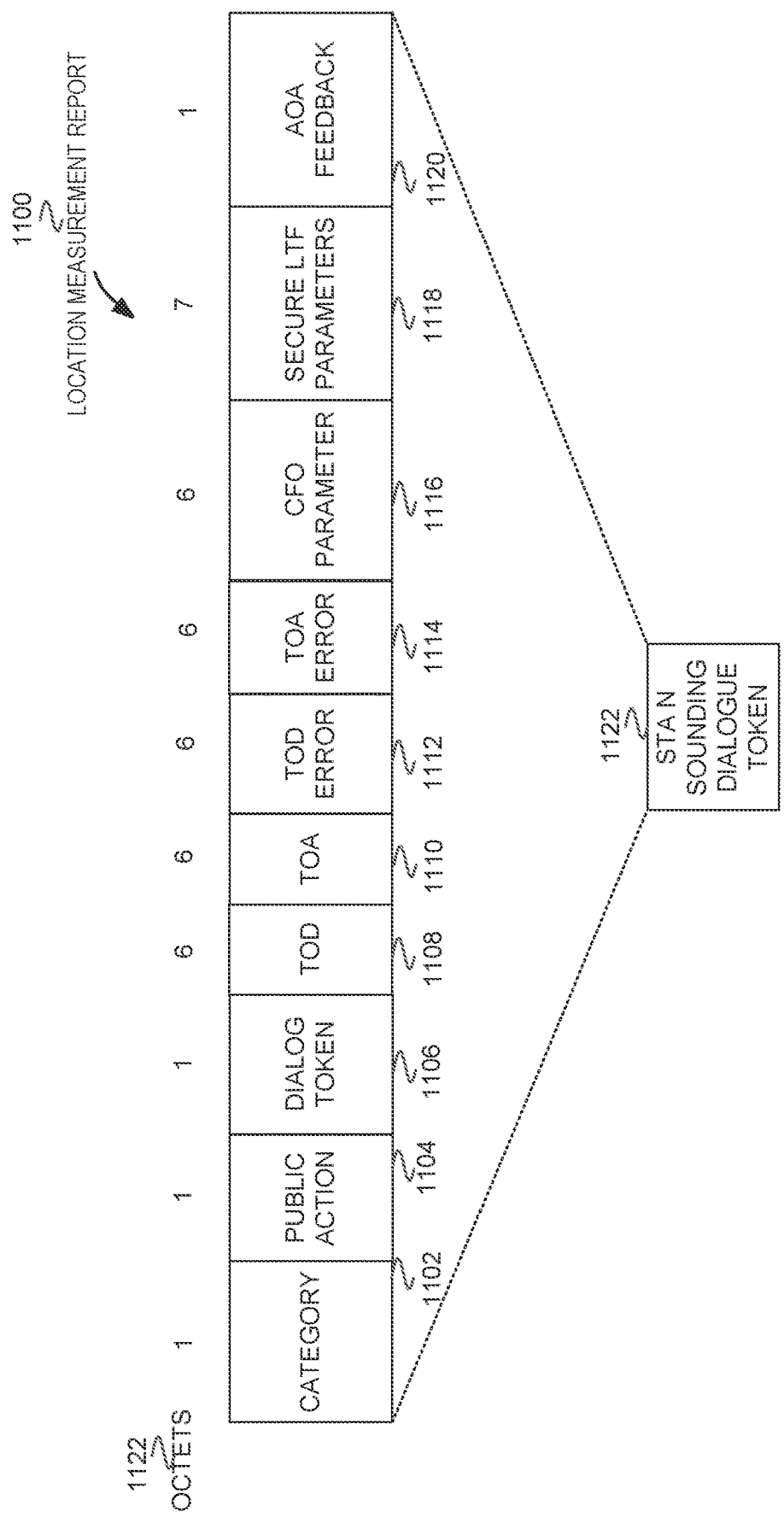
FIG. 11 illustrates location measurement report (LMR), in accordance with some embodiments.

FIG. 11 illustrates location measurement report (LMR) 1100, in accordance with some embodiments. LMR 1100 includes category 1102, public action 1104, dialog token 1106, time of departure (TOD) 1108, time of arrival (TOA) 1110, TOD error 1112, TOA error 1114, CFO parameter 116, secure LTF parameters 1118, and AOA feedback. LMR 1100 includes STA sounding dialogue token 1122, in accordance with some embodiments. The STA sounding dialogue token 1122 may be a fixed number of bits, e.g., 4 to 24 bits, and indicate a measurement sounding part for a corresponding ISTA that the LMR 1100 is for. STA sounding dialogue token 1122 may be the same or similar as STA N sounding dialogue token 1022, STA ranging counter 918, and/or ISTA counter 828. One or more of the subfields of LMR 1100 may be optional. LMR 1100 may include one or more additional subfields. In some embodiments, the dialog token subfield 1106 is used for the STA sounding dialogue subfield 1122.

The TOD subfield 1112 contains a timestamp that represents the time, with respect to a time base, at which the first HE-LTF symbol of the corresponding NDP frame appeared at the transmit antenna connector. The corresponding NDP frame in an RSTA-to-ISTA LMR frame 820 is a DL NDP 818 (the DL NDP 818 indicated for the ISTA in the NDPA 816), while in an ISTA-to-RSTA LMR frame 824 it is an UL NDP 814.

TOA subfield 1110 indicates a timestamp that represents the time, with respect to a time base, at which the first HE-LTF symbol of the corresponding NDP frame arrived at the receive antenna connector. The corresponding NDP frame in an RSTA-to-ISTA LMR frame 820 is an UL NDP 814, while in an ISTA-to-RSTA LMR frame 824 it is a DL NDP 818.

Figure 12:
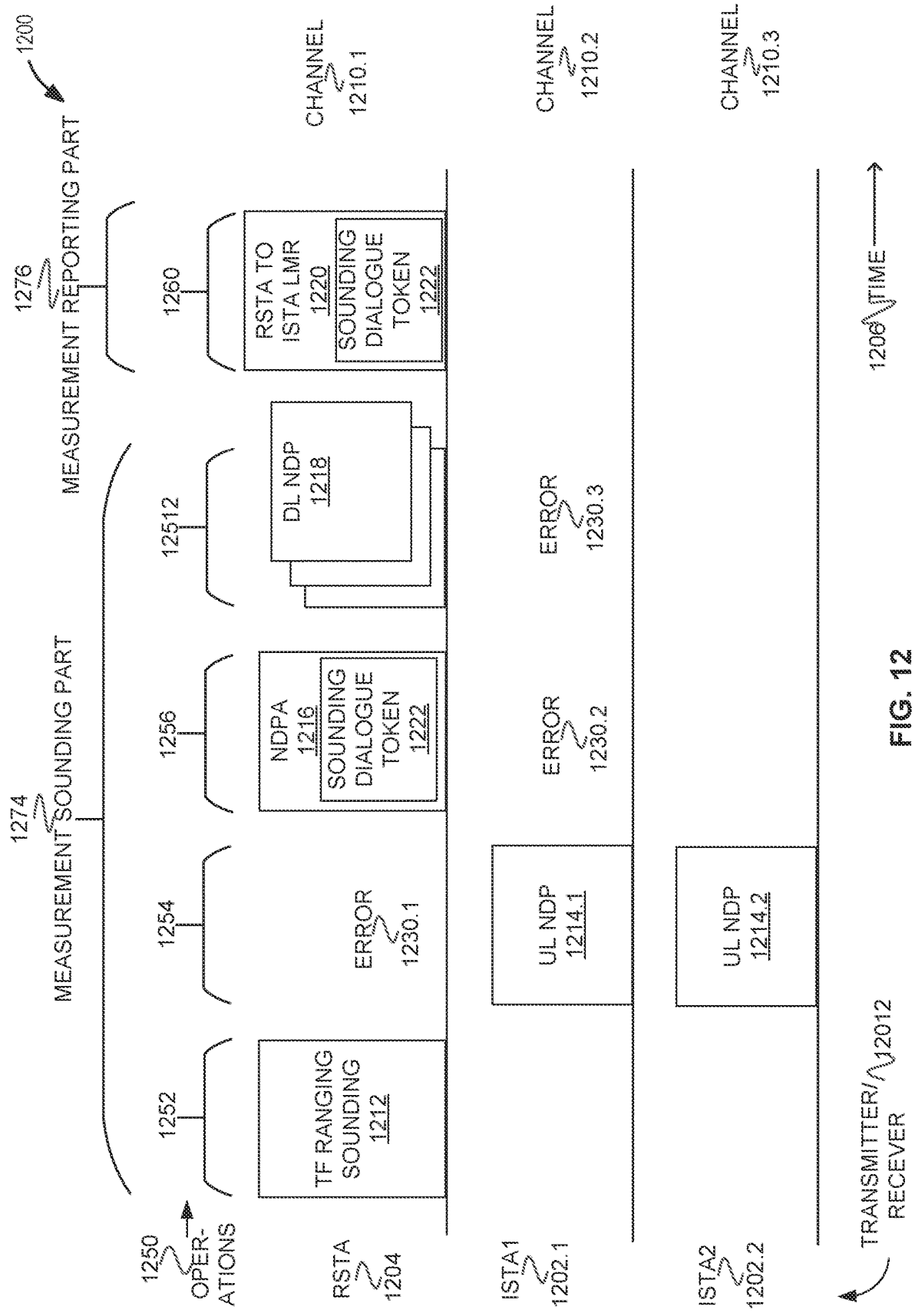
FIG. 12 illustrates a method of TB ranging, in accordance with some embodiments.

FIG. 12 illustrates a method 1200 of TB ranging, in accordance with some embodiments. Illustrated in FIG. 12 is ISTA1 1202.1, ISTA2 1202.2, RSTA 1204, time 1206, transmitter/receiver 1208, channels 1210, TF ranging sounding 1212, UL NDP 1214, NDPA frame 1216, DL NDP 1218, RSTA to ISTA LMR 1220, RSTA to ISTA LMR 1220, operations 1250, measurement sounding part 1274, and measurement reporting part 1276. The sounding dialogue token 1222 indicates a number for the current measurement sounding for which the NDPA 1216 and RSTA to ISTA LMR 1220 are part. The RSTA 1204 increments the sounding dialogue token 1222 and the ISTAs 1202 use the sounding dialogue token 1222 from the NDPA 1216 to ensure that the RSTA to ISTA LMR 1220 is from the same measurement sounding. Errors 1230 may lead to the ISTAs 1202 mistakenly concluding that the RSTA to ISTA LMR 1220 is to a same measurement sounding when it is not. The errors 1230 indicate either an error in transmission or reception, e.g., error 1230.1 indicates that one or both of UL NDP 1214.1, 1214.2 was not received by the RSTA 1204. Error 1230.2 and error 1230.3 indicate that NDPA 1216 and/or DL NDP 1218 were not received by ISTA1 1202.1.

ISTA1 1202.1 may receive sounding dialogue token 1222 from the NDPA 1216, but then not complete the current measurement sounding (which is numbered by the sounding dialogue token 1222). The RSTA 1204 may then not include ISTA1 1202.1 in subsequent measurement soundings. The ISTA1 1202.1 in a subsequent sounding may decode an RSTA to ISTA LMR 1220 where the sounding dialogue token 1222 indicates a same value as the earlier received sounding dialogue token 1222 from the NDPA 1216 from a previous measurement sounding (e.g., there may have been 64 measurement soundings between when the ISTA1 1202.1 received the sounding dialogue token 1222 from the NDPA 1216 and when the ISAT1 1202.1 received the sounding dialogue token 1222 from the RSTA to ISTA LMR 1220. The ISTA1 1202.1 may then determine an incorrection position due to using incorrection timing from an earlier measurement sounding.

Figure 13:
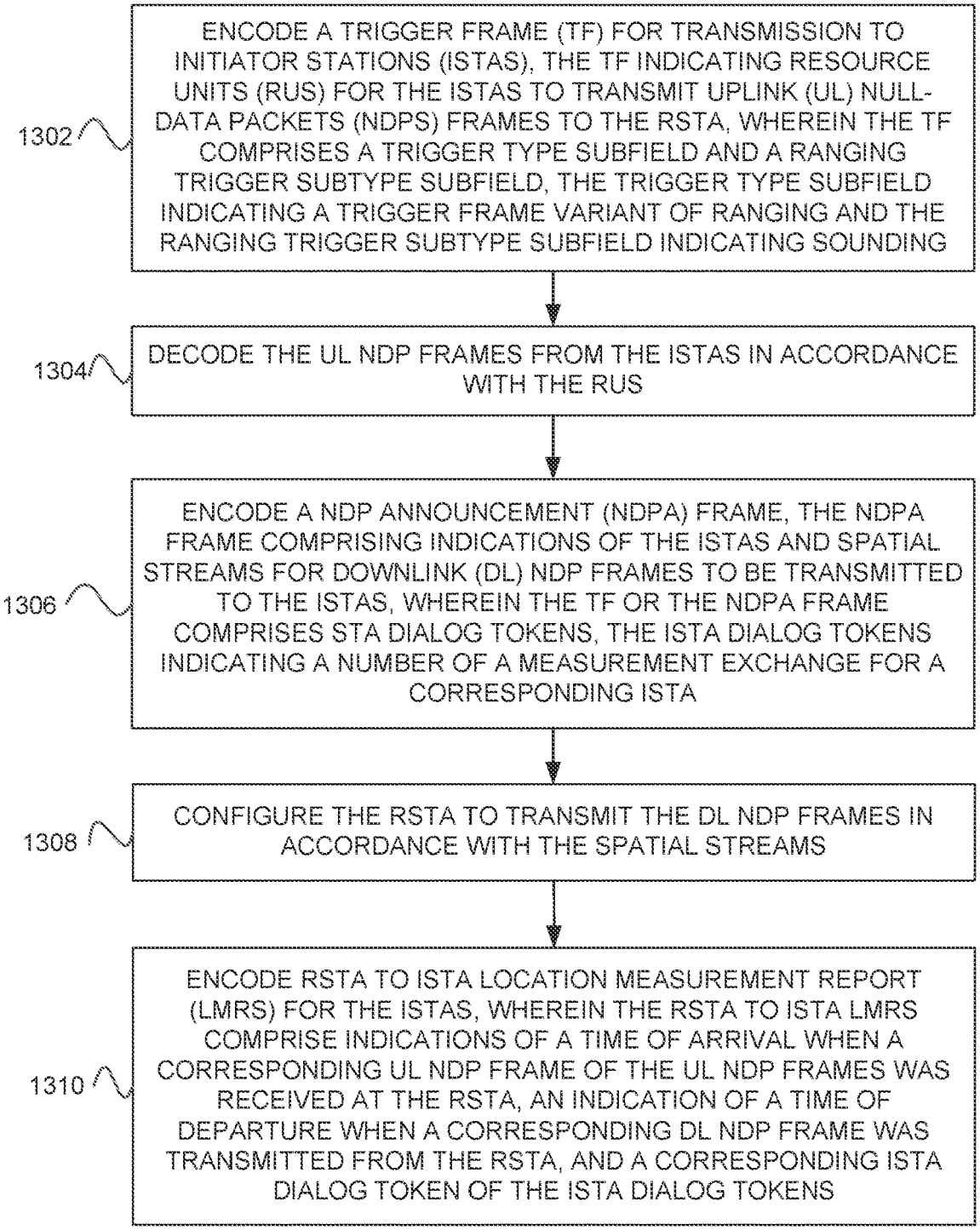
FIG. 13 illustrates a method of TB ranging, in accordance with some embodiments.

FIG. 13 illustrates a method 1300 of TB ranging, in accordance with some embodiments. The method 1300 begins at operation 1302 with encoding a TF for transmission to ISTAs, the TF indicating RUs for the ISTAs to transmit UL NDPs frames to the RSTA, where the TF comprises a trigger type subfield and a ranging trigger subtype subfield, the trigger type subfield indicating a trigger frame variant of ranging and the ranging trigger subtype subfield indicating sounding.

For example, RSTA 804 is configured to encode TF ranging sounding 812, which may be the same or similar as TF 1000, to ISTAs 802. TF 1000 includes trigger type 1020 and trigger subtype 1018. User info list field 1012 includes fields to indicate RUs for the ISTAs to transmit UL NDP 814.

The method 1300 continues at operation 1304 with decoding the UL NDP frames from the ISTAs in accordance with the RUs. For example, RSTA 804 decodes UL NDP frames 814.

The method 1300 continues at operation 1306 with encoding a NDPA frame, the NDPA frame comprising indications of the ISTAs and spatial streams for DL NDP frames to be transmitted to the ISTAs, where the TF or the NDPA frame comprises ISTA dialog tokens, the ISTA dialog tokens indicating a number of a measurement exchange for a corresponding ISTA.

For example, RSTA 804 encodes NDPA 816. NDPA 816 includes STA info subfields 912 that include AIDs of the ISTAs 802 and indications of spatial streams for DL NDP 818. The TF ranging sounding 812 or the NDPA 816 includes the STA counters 822, e.g., STA ranging counter 918 or STA sounding dialogue token 1022.

The method 1300 continues at operation 1308 with configuring the RSTA to transmit the DL NDP frames in accordance with the spatial streams. For example RSTA 894 is configured to transmit the DL NDP frames 818 in accordance with the spatial streams indicated in the NDPA.

The method 1300 continues at operation 1310 with encoding RSTA to ISTA LMRs for the ISTAs, where the RSTA to ISTA LMRs comprise indications of a time of arrival when a corresponding UL NDP frame of the UL NDP frames was received at the RSTA, an indication of a time of departure when a corresponding DL NDP frame was transmitted from the RSTA, and a corresponding ISTA dialog token of the ISTA dialog tokens. For example, RSTA is configured to encode RSTA to ISTA LMR 820 that comprises the time of arrival of a corresponding UL NDP 814 and the time of departure of a corresponding DL NDP 818 as well as STA counters 822, e.g., STA N sounding dialogue token 1122 where LMR 1100 is per ISTA 802.

The method 1300 may be performed by an apparatus of an ISTA, an apparatus of an RSTA, a RSTA, and/or an ISTA. Method 1300 may include one or more additional operations. One or more operations of method 1300 may be performed in a different order. One or more operations of method 1300 may be optional.

Figure 14:
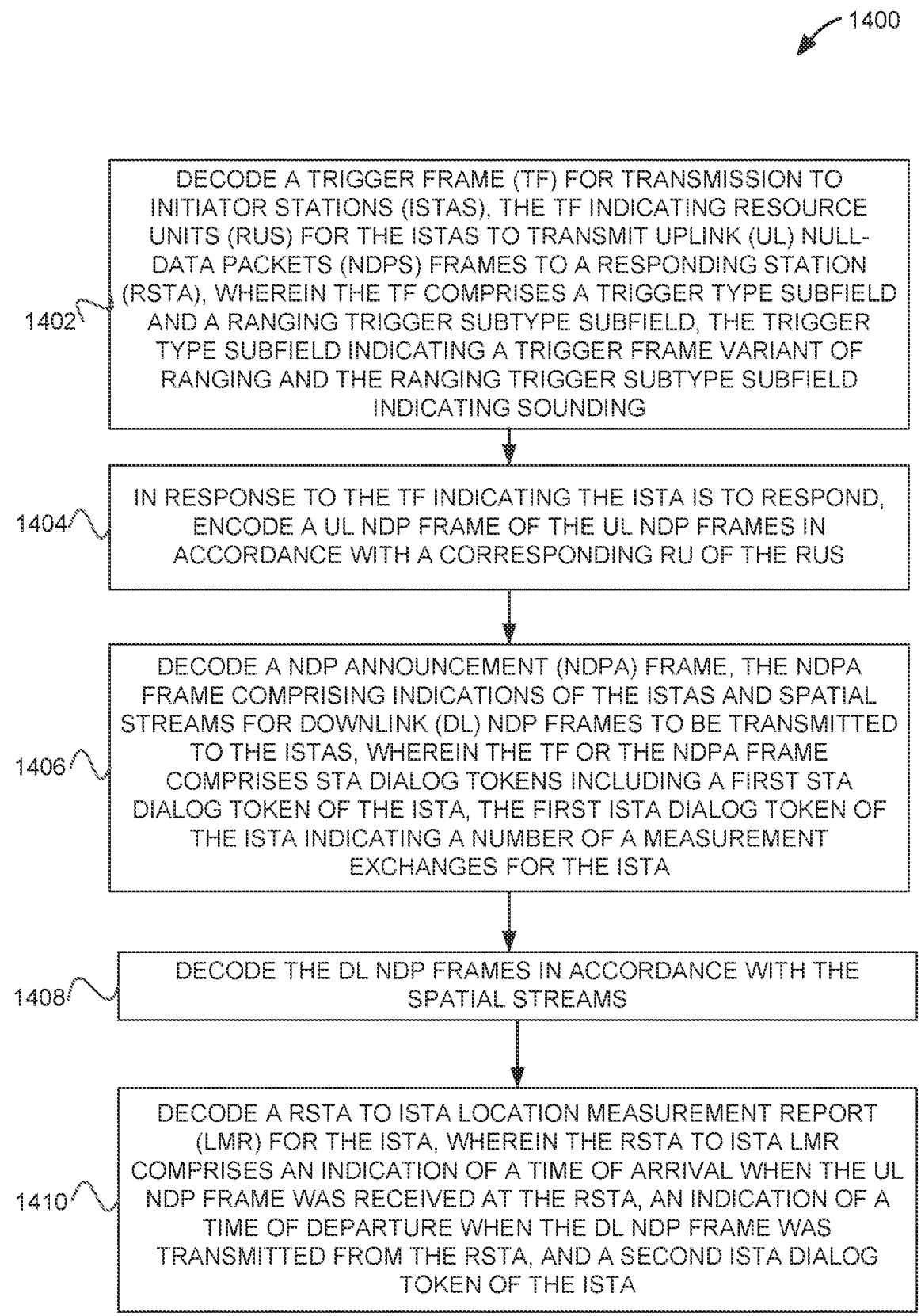
FIG. 14 illustrates a method of TB ranging, in accordance with some embodiments.

FIG. 14 illustrates a method 1400 of TB ranging, in accordance with some embodiments. The method 1400 begins at operation 1402 with decoding a TF for transmission to ISTAs, the TF indicating RUs for the ISTAs to transmit UL NDPs frames to a RSTA, where the TF comprises a trigger type subfield and a ranging trigger subtype subfield, the trigger type subfield indicating a trigger frame variant of ranging and the ranging trigger subtype subfield indicating sounding. For example, ISTAs 802 decodes TF ranging sounding 812 that includes trigger type 1020, trigger subtype 1018, and the RUs in the user info list subfields 1012.

The method 1400 continues at operation 1404 with in response to the TF indicating the ISTA is to respond, encode a UL NDP frame of the UL NDP frames in accordance with a corresponding RU of the RUs. For example, ISTAs 802 are configure to decode the TF ranging sounding 812 and respond with UL NDP 814 transmitted on the RUs, e.g., spatial streams, indicated in the TF ranging sounding 812.

The method 1400 continues at operation 1406 with decoding a NDPA frame, the NDPA frame comprising indications of the ISTAs and spatial streams for DL NDP frames to be transmitted to the ISTAs, where the TF or the NDPA frame comprises STA dialog tokens including a first STA dialog token of the ISTA, the first ISTA dialog token of the ISTA indicating a number of a measurement exchanges for the ISTA. For example, ISTA1 802.1 is configured to decode NDPA 816 and the TF ranging sounding 812 or NDPA 816 includes STA 1 sounding dialogue token 1022 or STA 1 ranging counter 918, respectively.

The method 1400 continues at operation 1408 with decoding the DL NDP frames in accordance with the spatial streams. For example, ISTA1 802.1 is configured to decode a corresponding DL NDP 818 in accordance with one or more spatial streams indicated in STA info 1 912.1.

The method 1400 continues at operation 14010 with decoding a RSTA to ISTA LMR for the ISTA, where the RSTA to ISTA LMR comprises an indication of a time of arrival when the UL NDP frame was received at the RSTA, an indication of a time of departure when the DL NDP frame was transmitted from the RSTA, and a second ISTA dialog token of the ISTA. For example, ISTA1 802.1 is configured to decode RSTA to ISTA LMR 820, which include a STA 1 sounding dialogue token 1122 for ISTA1 802.1. LMR 1100 includes TOD 1108 and TOA 1110.

The ISTA1 802.1 may compare the dialogue token from the TF ranging sounding 812 or NDPA 816 with the dialogue token from the RSTA to ISTA LMR 820 and if they do not indicate a same number, then ISTA1 802.1 will indicate that an error has occurred.

The method 1400 may be performed by an apparatus of an ISTA, an apparatus of an RSTA, a RSTA, and/or an ISTA.

Method 1400 may include one or more additional operations. One or more operations of method 1400 may be performed in a different order. One or more operations of method 1400 may be optional.

Figure 15:
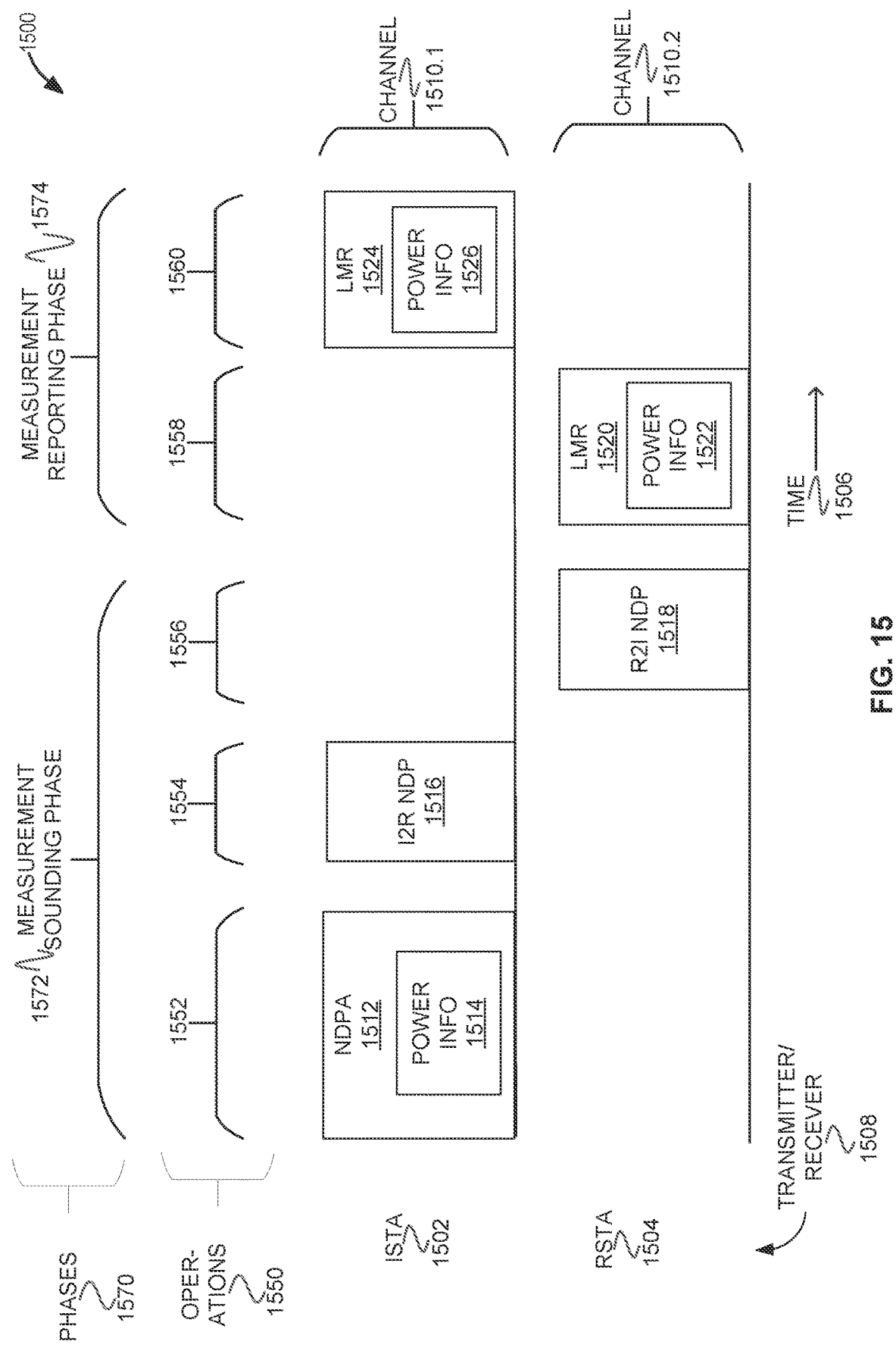
FIG. 15 illustrates a method for power control in non-trigger-based ranging, in accordance with some embodiments.

FIG. 15 illustrates a method 1500 for power control in non-trigger based ranging, in accordance with some embodiments. Illustrated in FIG. 15 is time 1506 along a horizontal axis, transmitter/receiver 1508 along a vertical axis, ISTA 1502, RSTA 1504, NDPA 1512, I2R NDP 1516, R2I NDP 1518, LMR 1520, and LMR 1524. operations 1550 along the top, and phases 1570 along the top. The ISTA 1502 may be a HE STA 504 or HE AP 502 as described in conjunction with FIG. 5, e.g., ISTA 1502 and RSTA 1504 may be configured to operate in accordance with IEEE 802.11az and/or EHT or HE. Channel 1510.1 and channel 1510.2 may be a sub-band, e.g., 20 MHz, of a bandwidth, e.g., 320 MHz, and may be a number of tones or subcarriers. Channel 1510.1 and channel 1510.2 may be the same channel. For illustration convenience, channel 1510.1 and channel 1510.2 are illustrated with different sizes, but channel 1510.1 and channel 1510.2 may be the same bandwidth and may be the same channel. Channel 1510.1 and channel 1510.2 may partially overlap.

NDPA 1512 may include power info 1514, LMR 1520 may include power info 1522, and LMR 1524 may include power info 1526.

The method 1500 begins at operation 1552 during a measurement sounding phase 1572 with the ISTA 1502 transmitting a NDPA frame 1512 to the RSTA 1504. The NDPA 1512 may be the same or similar as ranging NDP announcement frame 900 as disclosed in conjunction with FIG. 9. The NDPA 1512 may include a STA info 1 912.1 that indicates space time streams that the I2R NDP 1516 will be transmitted on to the RSTA 1504. The power info 1514 may include information related to transmission power as disclosed herein.

The method 1500 continues at operation 1554 with the ISTA 1502 transmitting I2R NDP 1516 in accordance with the NDPA 1512 to the RSTA 1504. The method 1500 continues at operation 1556 with the RSTA 1504 transmitting R2I NDP 1518 to the ISTA 1502.

The method 1500 continues at operation 1558 with the RSTA 1504 transmitting LMR 1520 to the ISTA 1502. LMR 1520 may be the same or similar as location measurement report 1100. LMR 1520 may include power info 1522. Power info 1522 may include information related to transmission power as disclosed herein.

The method 1500 may optionally include operation 1560 with ISTA 1502 transmitting LMR 1524 to RSTA 1504. LMR 1524 may include power info 1526. Power info 1526 may include information related to transmission power as disclosed herein.

Figure 16:
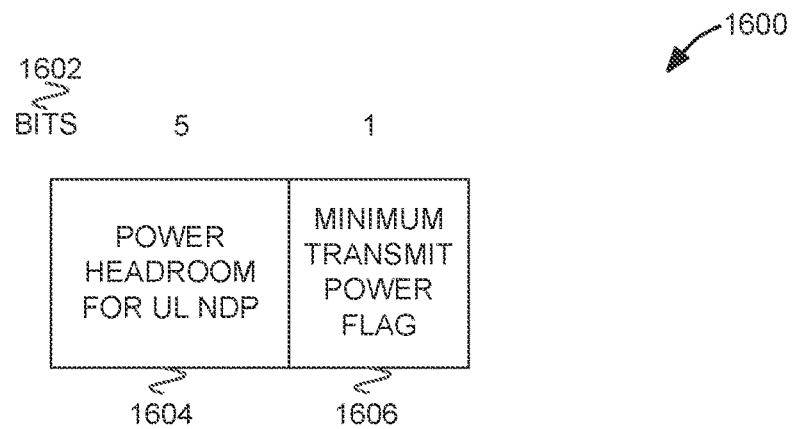
FIG. 16 illustrates power headroom, in accordance with some embodiments.

FIGS. 16-19 illustrate fields for power control in non-trigger based ranging, in accordance with some embodiments. FIGS. 15-19 will be disclosed in conjunction with one another. FIG. 16 illustrates power headroom 1600, in accordance with some embodiments. Illustrated in FIG. 16 is bits 1602, power headroom for UL NDP 1604, and minimum transmit power flag 1606. Power headroom for UL NDP 1604 indicates the available power headroom in units of dB for the I2R NDP frame 1516. In some embodiments power headroom for UL NDP 1604 indicates a value from 0 to 31 that maps to 0 dB to 31 dB. In some embodiments, the number of bits for power headroom for UL NDP 1604 is different. In some embodiments, the mapping between values of power headroom for UL NDP and dB is different. In some embodiments, minimum transmit power flag 1606 indicates the minimum transmit power of the I2R NDP frame 1516 has been reached, e.g., a value of 1 may indicate the minimum transmit power is reached.

Figure 17:
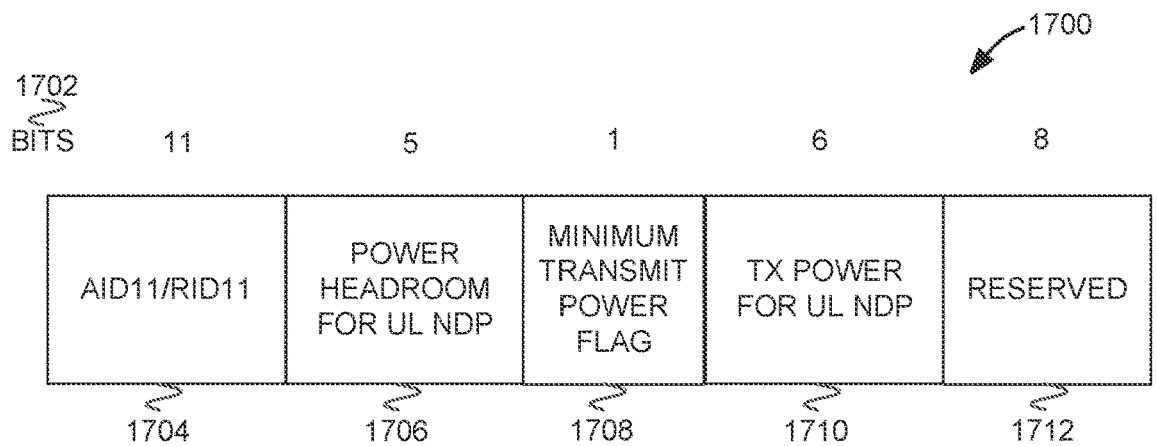
FIG. 17 illustrates a user info field of a NDPA frame, in accordance with some embodiments.

FIG. 17 illustrates a user info field 1700 of a NDPA frame, in accordance with some embodiments. Illustrated in FIG. 17 is bits 1702, AID11/RID11 1704, power headroom for UL NDP 1706, minimum transmit power flag 1708, Tx power for UL NDP 1710, and reserved 1712. The NDPA frame 1512 may include a user info field for RSTA 1504 and user info field 1700 to indicate the power headroom 1600. The number of bits 1702 may be different and there may be fewer or additional subfields. In some embodiments the value of AID11/RID11 1704 indicates that the user info field 1700 is for power headroom 1600, e.g., a value greater than a AID value and not currently used to indicate random access.

The ISTA 1502 is configured to encode power headroom 1600 in NDPA 1512, e.g., power info 1514 or user info field 1700, in accordance with some embodiments.

Figure 18:
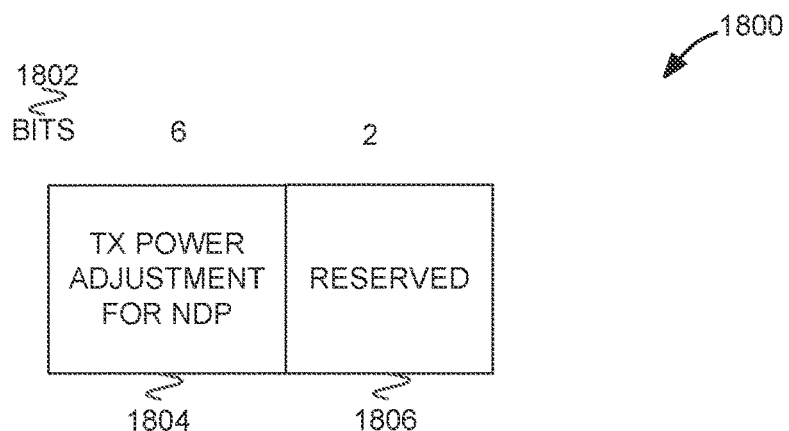
FIG. 18 illustrates transmit (TX) power adjustment for NDP, in accordance with some embodiments.

FIG. 18 illustrates transmit (TX) power adjustment 1800 for NDP, in accordance with some embodiments. Illustrated in FIG. 18 is bits 1802, TX power adjustment for NDP 1804, and reserved 1806. The number of bits 1802 may be different. There may be fewer or additional subfields. TX power adjustment for NDP subfield 1804 indicates how much Tx power of I2R NDP 1516 the ISTA 1502 should adjust in units of dB. TX power adjustment for NDP subfield 1804 indicates a value from 0 to 63, which maps to −32 dB to 31 dB TX power adjustment, in accordance with some embodiments. In some embodiments, the value range is different and/or the mapping between the values and the dB TX power adjustment is different.

The RSTA 1504 is configured to receive the power headroom 1600 from the ISTA 1502 and determine a TX power adjustment for NDP, e.g., the I2R NDP 1516. The RSTA 1504 encodes the LMR 1520 to include the TX power adjustment for NDP 1800 in the LMR 1520, e.g., location measurement report 1900.

Figure 19:
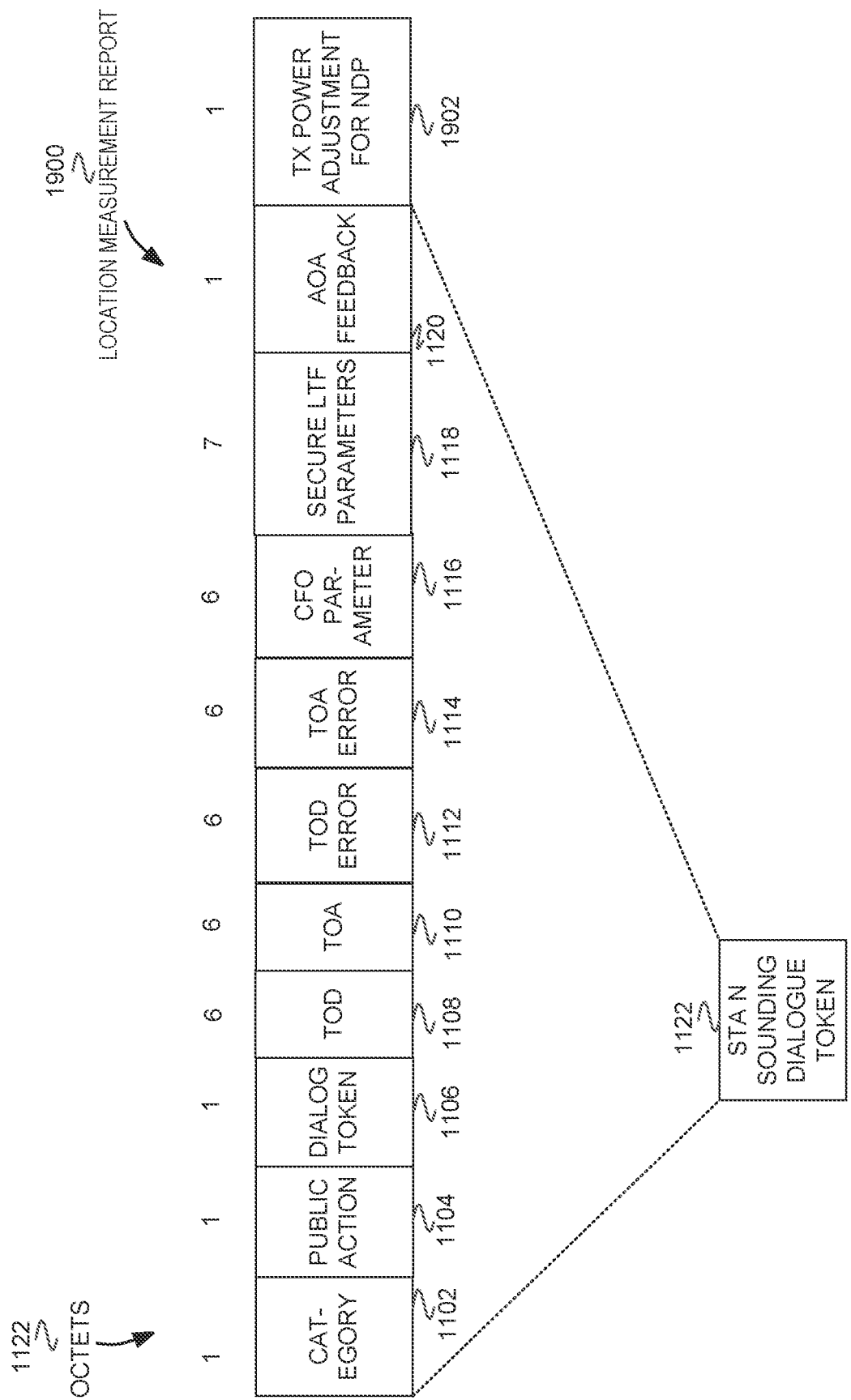
FIG. 19 illustrates a location measurement report, in accordance with some embodiments.

FIG. 19 illustrates a location measurement report 1900, in accordance with some embodiments. Subfields 1102 through 1122 are the same or similar as disclosed in conjunction with FIG. 11. Tx power adjust for NDP 1902 is an optional field that indicates the TX power adjustment for NDP as disclosed in conjunction with FIG. 18. The TX power adjustment for NDP 1902 may be in a different position of the LMR 1900 and/or may be indicated in a different manner, e.g., another subfield may be used to indicate the TX power adjustment for NDP 1902, e.g., secure LTF parameters subfield 1118.

In some embodiments, the RSTA 1504 includes the TX power adjustment 1800 for the I2R NDP 1516 in LMR frame 1520. The ISTA 1502 after receiving LMR 1520 from RSTA 1504 with the TX power adjustment 1800, changes TX power used to transmit I2R NDP 1516 in the next measurement sounding phase, if the ISTA 1502 can accommodate the TX power adjustment 1800, otherwise, the ISTA 1502 can ignore the TX power adjustment 1800 (or reduce the TX power adjustment 1800). In some embodiments, the ISTA 1502 includes a TX power adjustment 1800 for R2I NDP 1518, e.g., in a user info field of the NDPA 1512. In some embodiments, sing the Offset field of a STA info field for a ranging NDP announcement frame may be used to indicate the TX power adjustment 1800.

The RSTA 1504 after receiving the NDPA frame 1512 that includes the TX power adjustment 1800 for R2I NDP 1518 may adjust the TX power for R2I NDP 1518, if the TX power adjustment 1800 can be accommodated. The RSAT 1504 may reduce the magnitude of the TX power adjustment 1800 or not adjust the TX power of the R2I NDP 1518, if RSTA 1504 cannot accommodate the Tx power adjustment 1800.

ISTA 1502 and/or RSTA 1504 can set the TX power adjustment 1800 for the next round of measurement sounding based on the TX power level and TX power headroom included in the NDPA 1512 or LMR frames 1520. For example, the TX power adjustment 1800 and/or power headroom 1600 may be included in the NDPA 1512, where the TX power adjustment 1800 is for the R2I NDP 1518 and the power headroom 1600 is for the I2R NDP 1516, and the TX power adjustment 1800 and/or power headroom 1600 may be included in the LMR 1520, where the TX power adjustment 1800 is for the I2R NDP 1516 and the power headroom 1600 is for the R2I NDP 1518.

Equation (1) gives signal to interference and noise ratio (SINR) at a receiver side of an NDP frame, e.g., RSTA 1504 receiving I2R NDP 1516 and ISTA 1502 receiving R2I NDP 1518.

Equation (1) $SINR=Ptx*Pathloss/(Interferene\_noise+Ptx*Txevm*Pathloss)$, where Ptx is transmit power, Pathloss denotes the path loss between the transmitter and receiver, Interference_noise is the interference plus noise at receiver side, and Txevm is the error vector magnitude (EVm) due to the nonlinearity of power amplifier at transmitter side where the higher the Ptx, the larger the Txevm is.

The SINR value directly relates with the ToA estimation accuracy, and in general high SINR provides a more accurate ToA estimation. Where the time of arrival (ToA) is the time, with respect to a time base, at which the first HE-LTF symbol of the corresponding NDP frame (I2R NDP 1516 or R2I NDP 1518) arrived at the receive antenna connector (RSTA 1504 or ISTA 1502, respectively.)

To assist the transmitter of NDP to tune the Ptx, the receiver of NDP frame can feed the SINR and Pathloss values to the transmitter side, and the transmitter can figure out the value of Interference_noise based on the Ptx and the SINR and Pathloss feedback, then the transmitter can tune the Ptx to optimize SINR.

In the NDPA frame the ISTA can include the Tx transmitter power Ptx, and in the LMR frame the RSTA can include the Pathloss and SINR values, and after receiving these feedbacks, the ISTA can adjust its transmit power of UL NDP in the next round measurement sequence.

To help the RSTA control the transmit power of DL NDP, the ISTA can includes the SINR value of DL NDP in the NDPA frame of next round measurement sequence, and based on the SINR value of DL NDP, the Ptx of the DL NDP, and the Pathloss between ISTA and RSTA, the RSTA can determine how to adjust the tx power of DL NDP. The pathloss can be estimated based on the UL NDP, and in general the pathloss of UL NDP and DL NDP are the same, so it's not necessary for ISTA to indicate the pathloss value of DL NDP to RSTA, but the ISTA may include the Pathloss of DL NDP in the NDPA frame of next round measurement sequence.

Figure 20:
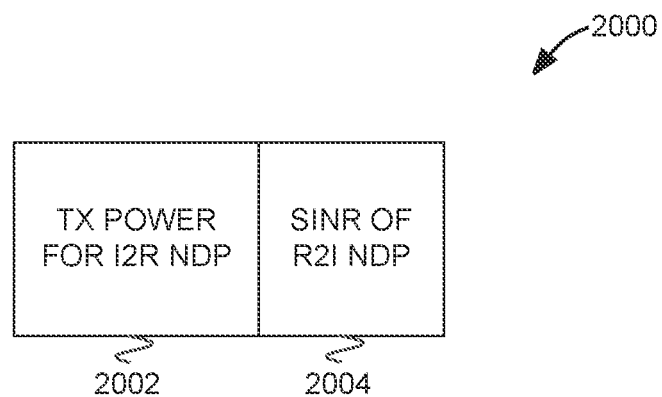
FIG. 20 illustrates power info, in accordance with some embodiments.

FIG. 20 illustrates power info 2000, in accordance with some embodiments. FIG. 20 illustrates TX power for I2R NDP 2002 and SINR of R2I NDP 2004. The NDPA frame 1512 can include one or both of TX power for I2R NDP 2002 and SINR of R2I NDP 2004. The Tx power for I2R NDP subfield 2002 indicates the Tx power level in dB for I2R NDP following the NDPA frame 1512 and the SINR of R2I NDP 2004 indicates the SINR value in dB of the R2I NDP frame 1518 in the last round measurement sequence at the ISTA 1502.

Figure 21:
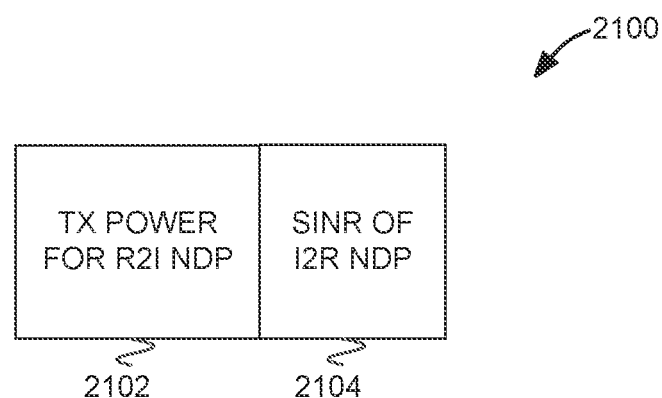
FIG. 21 illustrates power info, in accordance with some embodiments.

FIG. 21 illustrates power info 2100, in accordance with some embodiments. Illustrated in FIG. 21 is TX power for R2I NDP 2102 and SINR of I2R NDP 2104. The RSTA-to-ISTA LMR frame 1520 can include one or both of TX power for R2I NDP 2102 and SINR of I2R NDP 2104. TX power for R2I NDP 2102 denotes the power level in dB of the R2I NDP frame 1518 in the current round measurement sequence and the SINR of I2R NDP 2104 denotes the SINR value in dB for the UL NDP in the current round measurement sequence at the RSTA 1504. In some embodiments, the bit width is 1 to 16 bits with a mapping between the bit values and dB values for each of fields TX power for I2R NDP 2002, SINR of R2I NDP 2004, TX power for R2I NDP 2102, and SINR of I2R NDP 2104.

In some embodiments, only the SINR value for power control is used at the ISTA 1502 or RSTA 1504. Based on the SINR value of I2R NDP 1516 or R2I NDP 1518, Equation (2) can be derived.

Equation (2): $Interference\_noise=Ptx*Pathloss/SINR-Ptx*Txevm*Pathloss$. Assume the Ptx of I2R NDP 1516 or R2I NDP 1518 is increased or decreased by alpha times and the Txevm is changed by beta times correspondingly, then the new SINR at the receiver side of the NDP frame becomes:

Equation (3): $SINR\_new=alpha*Ptx*Pathloss/(Interferen\_noise+alpha*beta*Ptx*Txevm*Pathloss)$. Substituting Equation (2) into equation (3), gives Equation (4): $SINR\_new=alpha/(I/SINR+(alpha*beta-1)*Txevm)$.

The ISTA 1502 and RSTA 1504 are configured to determine the values of alpha and beta based on equation (4) to make sure that the SINR_new of the NDP (I2R NDP 1516 or R2I NDP 1518) can be improved.

In some embodiments, the SINR field includes 8 bits, and maps to −10 dB to 53.75 dB with 0.25 dB resolution. In some embodiments, the SINR field, e.g., 2004 or 2104, has a different number of bits and/or a different mapping to dB.

The ISTA 1502 and/or RSTA 1504 can calculation the SINR in the time domain, for example utilizing the guard interval of the L-LTF or in the frequency domain, and if SINR is calculated in frequency domain, then it will be averaged over all the tones. Additionally, ISTA 1502 and RSTA 1504 may average the SINR over different Tx spatial streams and Rx chains.

In some embodiments, TX power (used for I2R NDP 1516 or R2I NDP 1518) and target RSSI (for I2R NDP 1516 or R2I NDP 1518) are included in the NDPA frame 1512 (e.g., a ranging NDPA) and the LMR 1520 (e.g., a RSTA-to-ISTA LMR).

As disclosed herein, the NDPA frame 1512 may be the same or similar as ranging NDP announcement 900. NDPA frame 1512 does not include the STA 1 ranging counter 918.1 through STA N ranging counter 918.N, in accordance with some embodiments.

In non-trigger based measurement sequences as is illustrated in FIG. 15, the RA subfield 906 can be used to identify the intended RSTA 1504 recipient of the NDPA frame 1512.

FIG. 22 illustrates a STA info field 2200 of a NDPA frame, in accordance with some embodiments. Illustrated in FIG. 22 is AID11/RSID11 2204, offset 2206, R2I_N_STS 2208, R2I repetitions (REP) 2210, I2R_N_STS 2212, reserved 2214, disambiguation 2216, I2R rep 2218, and reserved 2214.

The NDPA frame 1512 includes a STA info field 2200 for RSTA 1504. The AID11/RSID11 subfield 2204 and offset subfield 2206 of the STA info field 2220 for RSTA 1504 are used for power control field 2300, in accordance with some embodiments.

FIG. 23 illustrates power control field 2300, in accordance with some embodiments. Illustrated in FIG. 23 is bits 2302, I2R NDP TX power subfield 2304, R2I NDP target RSSI subfield 2306, disambiguation subfield 2308, R2I NDP target RSSI subfield 2310, and reserved subfield 2312.

FIG. 23 illustrates an embodiment where bits B0 through B16 of power control field 2300 are bits B0 through B16 of STA info field 2200. Disambiguation subfield 2308 is set to 1 to avoid VHT STAs from wrongly interpreting the AID11/RSID11 subfield 2204 in the NDPA frame 1512. In some embodiments, a different number of bits is used for one or more of the subfields I2R NDP TX power subfield 2304, R2I NDP target RSSI subfield 2306, disambiguation subfield 2308, R2I NDP target RSSI subfield 2310, and reserved subfield 2312. In some embodiments, the bits of the subfields I2R NDP TX power subfield 2304, R2I NDP target RSSI subfield 2306, disambiguation subfield 2308, R2I NDP target RSSI subfield 2310, and reserved subfield 2312 are mapped differently to the STA info field 2200.

In some embodiments, subfields I2R NDP TX power subfield 2304, R2I NDP target RSSI subfield 2306, R2I NDP target RSSI subfield 2310 are encoded the same or similarly as in IEEE 802.1 lax. In some embodiments, the TX power (e.g., I2R NDP TX power subfield 2304) is reported with a resolution of 1 dB with values in the range 0 to 60 representing −20 dBm to 40 dBm, respectively, and values above 60 are reserved. In some embodiments, the target RSSI (e.g., 2306 and 2310) is encoded in accordance with Table 1. In some embodiments, the target RSSI is encoded differently.

TABLE 1

Target RSSI SUBFIELD ENCODING

| TARGET RSSI SUBFIELD | DESCRIPTION |
| --- | --- |
| 0-90 | Values 0 to 90 map to −110 dBm to −20 dBm |
| 91-126 | Reserved |
| 127 | Indicates to the STA to transmit an HE TB PPDU response at its maximum power for the assigned MCS or HE-MCS. |

In some embodiments, an additional STA info field 2200 is added to the NDPA frame 1512 (e.g., one for the RSTA 1504 and one for including the subfields of the power control field 2300.)

Figure 24:
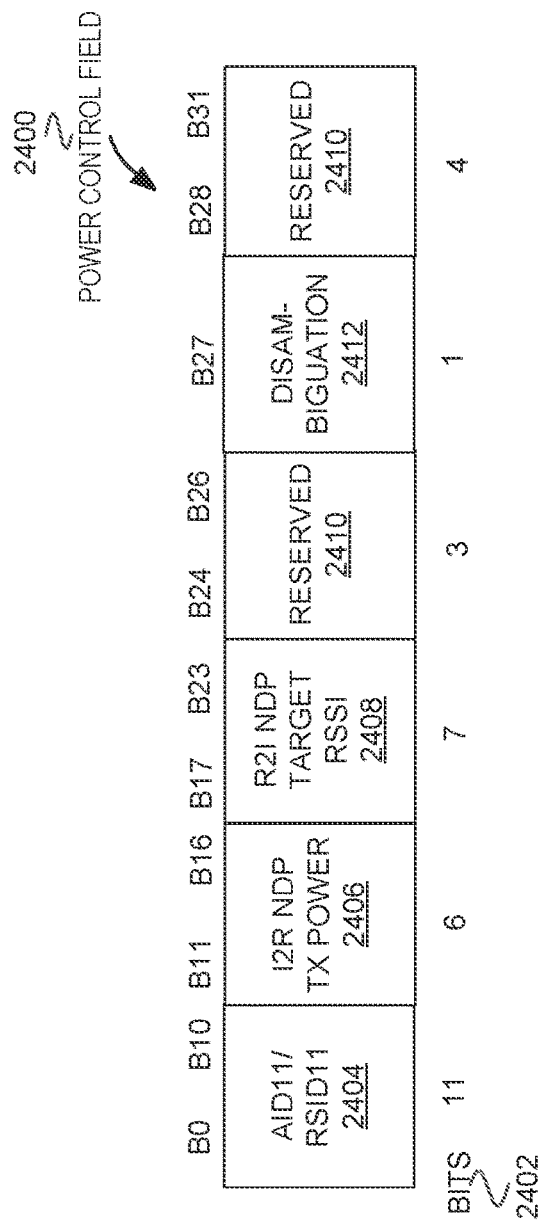
FIG. 24 illustrates a power control field, in accordance with some embodiments.

FIG. 24 illustrates a power control field 2400, in accordance with some embodiments. Illustrated in FIG. 24 is bits 2402, AID11/RSID11 subfield 2404, I2R NDP TX power subfield 2406, R2I NDP target RSSI subfield 2408, reserved subfield 2410, disambiguation 2412, and reserved subfield 2410. Power control field 2400 may be included in the NDPA frame 1512 along with a STA info field 2200 for the RSTA 1504. The AID11/RSID11 2404 indicates a value to indicate that the STA info field is a power control field 2400, e.g., the values may be greater than 2007 such as 2043, 2044, 2045, 2046, or anther value greater than 2007.

In some embodiments, the ISTA 1502 encodes the NDPA frame 1512 to include power control field 2400 or 2300. ISTA 1502 may use power control field 2400 or 2300 for transmit power control of R2I NDP 1518. The RSTA 1504 decodes the NDPA frame 1512 and the power control field 2400 or 2300 and estimates path loss based on RSSI at RSTA 1504 of I2R NDP 1516 and the value indicated by I2R NDP TX power subfield 2406 or 2304. RSTA 1504 tunes TX power of R2I NDP 1518 based on path loss and R2I NDP target RSSI 2408 or 2306. One or more of the subfields of the power control field 2400 may be encoded as part of the NDPA frame 1512 differently.

Figure 25:
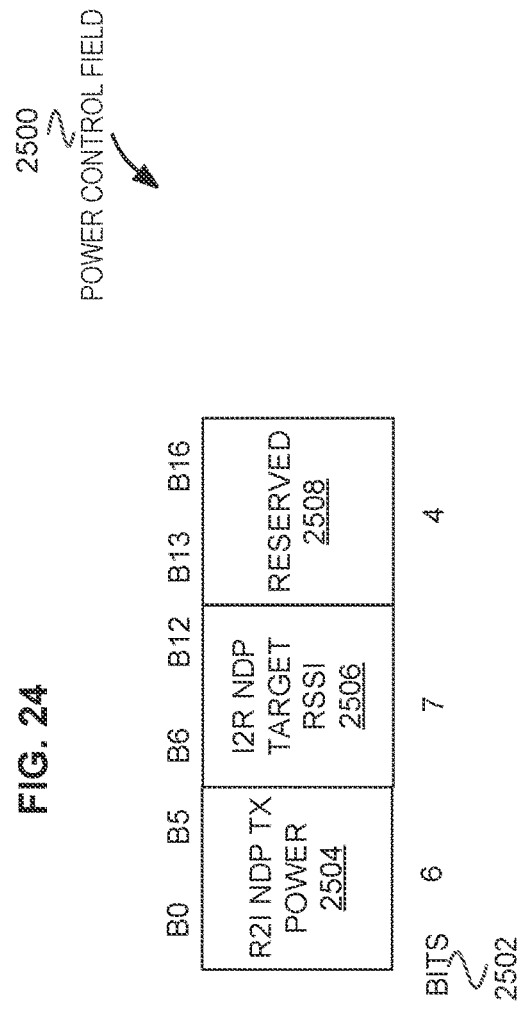
FIG. 25 illustrates a power control field, in accordance with some embodiments.

FIG. 25 illustrates a power control field 2500, in accordance with some embodiments. Illustrated in FIG. 25 is bits 2502, R2I NDP TX power subfield 2504, I2R NDP target RSSI subfield 2506, and reserved subfield 2508.

Power control field 2500 can be used by RSTA 1504 for power control of I2R NDP frame 1516. Power control field 2500 or one or more subfields of power control field 2500 may be included in LMR 1520. ISTA 1502 may use power control field 2500 to tune the TX power used to transmit I2R NDP frame 1516 in a next round of measurement sequence, e.g., after receiving the LMR 1520.

The ISTA 1504 decodes the LMR frame 1520 and the power control field 2500 and estimates path loss based on RSSI at ISTA 1502 of R2I NDP 1518 and the value indicated by R2I NDP TX power subfield 2504. ISTA 1502 tunes TX power of I2R NDP 1516 based on path loss and I2R NDP target RSSI 2506. One or more of the subfields of the power control field 2500 may be encoded as part of the LMR frame 1520 differently. In some embodiments, power control field 2500 is added after CFO parameters 1116 (FIG. 11) to the location measurement report 1100.

TX power, target RSSI are measurement using a 20 MHz band, in accordance with some embodiments. If the RSTA 1504 or ISTA 1502 does not support power control, then the related power control field is ignored or not included, in accordance with some embodiments. RSTA 1504 and ISTA 1502 may negotiate support for power control.

FIG. 26 illustrates a ranging parameter element 2600, in accordance with some embodiments. Illustrated in FIG. 26 is bits 2602, subelement ID subfield 2604, length subfield 2606, immediate LMR feedback subfield 2608, minimum (min) time between measurements subfield 2610, maximum time between measurements subfield 2612, and reserved subfield 2614.

Ranging parameter element 2600 illustrates the format of the non-trigger based specific subelement in the Ranging Parameter element, in accordance with some embodiments. Bit 60 (or 61, 62, 63) is used for power control negotiation and defined as power control subfield. In the negotiation procedure between ISTA 1502 and RSTA 1504, in the initial fine timing measurement request (IFTMR) frame, if Bit 60 is set to 1, it indicates ISTA 1502 supports power control for non-trigger based (NTB) ranging, and if RSTA 1504 also supports power control in NTB, RSTA sets bit 60 to 1 in the IFTM frame. In the NTB measurement sequence ISTA 1502 and RSTA 1504 use power control as disclosed herein for power control, in accordance with some embodiments.

If ISTA 1502 sets bit 60 in IFTMR frame to 0, it indicates the ISTA 1502 does not support power control for NTB, and the RSTA shall also set the Bit 60 to 0 in the IFTM frame, in accordance with some embodiments. Power control with bit 60 set to 0 is not and the fields disclosed herein for power control support are reserved, in accordance some embodiments.

Returning to method 1500, the method 1500 may include a set-up phase prior to measurement sounding phase 1572, the set-up phase may include exchanging ranging parameter element 2600. The method 1500 may include (not illustrated) the ISTA 1502 contending for and acquiring the wireless medium (e.g., channel 1510.1) so that the frames are exchanged during a single transmission opportunity. The time between the operation of method 1500 may be a SIFS. Method 1500 may include one or more additional operation. The operations of method 1500 may be performed in a different order. In some embodiments, one or more operations of method 1500 are optional.

Figure 27:
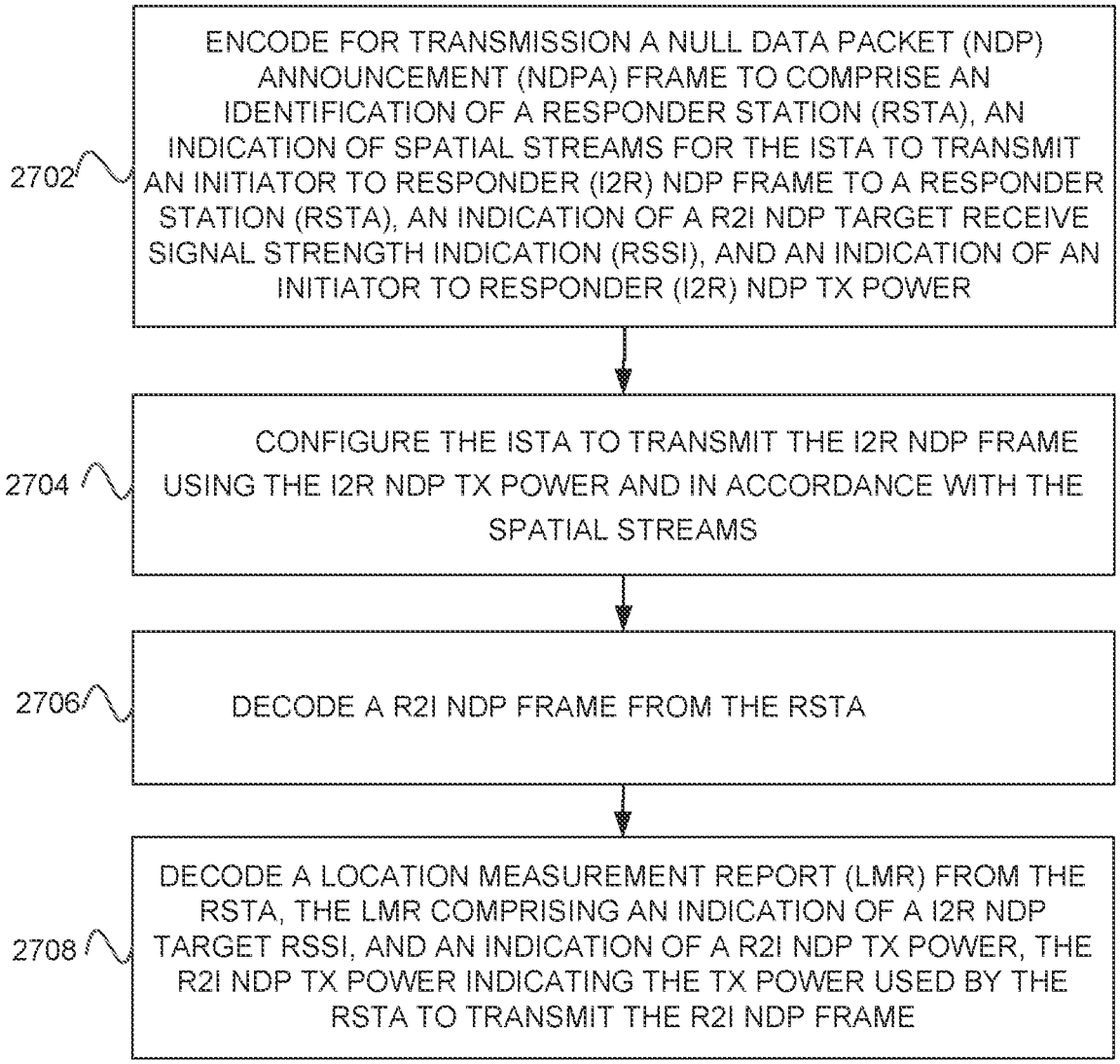
FIG. 27 illustrates a method of power control, in accordance with some embodiments.

FIG. 27 illustrates a method 2700 of power control, in accordance with some embodiments. The method 2700 begins at operation 2702 with encoding for transmission a NDPA frame, the NDPA frame comprising an identification of a RSTA, an indication of spatial streams for the ISTA to transmit an I2R NDP frame to the RSTA, an indication of a R2I NDP target RSSI, and an indication of an I2R NDP TX power. For example, ISTA 1502 encodes NDPA 1512 to include power info 1514, which may include power control field 2300 or power control field 2400. The STA info field 2200 of the NDPA 900 comprises I2R_N_STS subfield 2212 to indicate spatial streams.

The method 2700 continues at operation 2704 with configure the ISTA to transmit the I2R NDP frame using the I2R NDP TX power and in accordance with the spatial streams. For example, ISTA 1502 transmits I2R NDP 1516 using an I2R NDP TX power and in accordance with the spatial streams indicated in the NDPA 1512, in accordance with some embodiments.

The method 2700 continues at operation 2706 with decoding a R2I NDP frame from the RSTA. For example, ISTA 1502 decodes R2I NDP 1518 from RSTA 1504.

The method 2700 continues at operation 2708 with decoding a LMR from the RSTA, the LMR comprising an indication of a I2R NDP target RSSI, and an indication of a R2I NDP TX power, the R2I NDP TX power indicating the TX power used by the RSTA to transmit the R2I NDP frame. For example, ISTA 1502 decodes LMR 1520. LMR 1520 may include power info 1522, which may include power control field 2500, which includes R2I NDP TX power 2504 and I2R NDP target RSSI 2506.

The method 2700 may be performed by an apparatus of an ISTA, an apparatus of an RSTA, a RSTA, and/or an ISTA. Method 2700 may include one or more additional operations. One or more operations of method 2700 may be performed in a different order. One or more operations of method 2700 may be optional.

Figure 28:
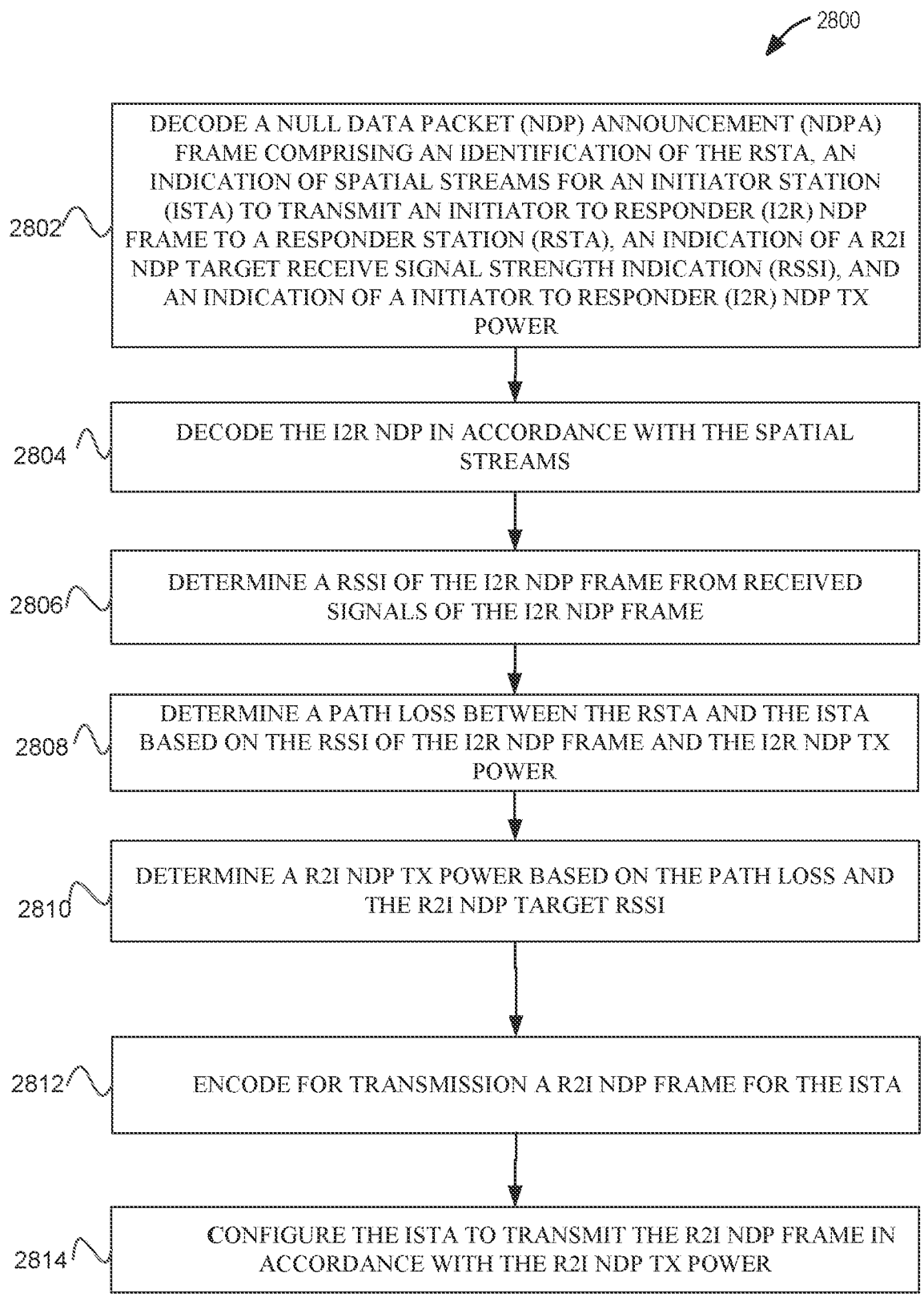
FIG. 28 illustrates a method of power control, in accordance with some embodiments.

FIG. 28 illustrates a method 2800 of power control, in accordance with some embodiments. The method 2800 begins at operation 2800 with decoding a NDPA frame comprising an identification of the RSTA, an indication of spatial streams for an ISTA to transmit an I2R NDP frame to a RSTA, an indication of a R2I NDP target RSSI, and an indication of a I2R NDP TX power. For example, RSTA 1504 may decode NDPA 1512 from ISTA 1502, the NDPA 1512 may include a STA info subfield 912 for the RSTA 904. The STA info field 2200 includes subfields to indicate the spatial streams, e.g., I2R_N_STS 2212 and the STA info field 2200 may include power control field 2300 or 2400, which include I2R NDP TX power 2304 and R2I NDP target RSSI 2306.

The method 2800 continues at operation 2804 with decoding the I2R NDP in accordance with the spatial streams. For example, RSTA 1504 decodes I2R NDP 1516.

The method 2800 continues at operation 2806 with determining a RSSI of the I2R NDP frame from received signals of the I2R NDP frame. For example, RSTA 1504 is configured to determine an RSSI of I2R NDP 1516.

The method 2800 continues at operation 2808 with determining a path loss between the RSTA and the ISTA based on the RSSI of the I2R NDP frame and the I2R NDP TX power. For example, RSTA 1504 is configured to determine a path loss based on the RSSI of I2R NDP 1516 and I2R NDP TX power 2304.

The method 2800 continues at operation 2810 with determining a R2I NDP TX power based on the path loss and the R2I NDP target RSSI. For example, RSTA 1504 is configured to determine a R2I NDP TX power 2504 based on the path loss and the R2I NDP target RSSI 2306.

The method 2800 continues at operation 2812 with encoding for transmission a R2I NDP frame for the ISTA. For example, RSTA 1504 may encode R2I NDP 1518 for transmission to ISTA 1502.

The method 2800 continues at operation 2814 with configuring the RSTA to transmit the R2I NDP frame in accordance with the R2I NDP TX power. For example, the RSTA 1504 may transmit R2I NDP 1518 in accordance with the R2I NDP TX power 2504.

The method 2800 may be performed by an apparatus of an ISTA, an apparatus of an RSTA, a RSTA, and/or an ISTA. Method 2800 may include one or more additional operations. One or more operations of method 2800 may be performed in a different order. One or more operations of method 2800 may be optional.

Example 1 is an apparatus of a responding station (RSTA), the apparatus comprising memory; and processing circuitry coupled to the memory, the processing circuitry configured to: encode a trigger frame (TF) for transmission to initiating stations (ISTAs), the TF indicating resource units (RUs) for the ISTAs to transmit uplink (UL) null-data packets (NDPs) frames to the RSTA, wherein the TF comprises a trigger type subfield and a ranging trigger subtype subfield, the trigger type subfield indicating a trigger frame variant of ranging and the ranging trigger subtype subfield indicating sounding; decode the UL NDP frames from the ISTAs in accordance with the RUs; encode a NDP announcement (NDPA) frame, the NDPA frame comprising indications of the ISTAs and spatial streams for downlink (DL) NDP frames to be transmitted to the ISTAs, wherein the TF or the NDPA frame comprises ISTA dialog tokens, the ISTA dialog tokens indicating a number of a measurement exchanges for a corresponding ISTA of the ISTAs; configure the RSTA to transmit the DL NDP frames in accordance with the spatial streams; and encode RSTA to ISTA location measurement report (LMRs) for the ISTAs, wherein the RSTA to ISTA LMRs comprise indications of a time of arrival when a corresponding UL NDP frame of the UL NDP frames was received at the RSTA, an indication of a time of departure when a corresponding DL NDP frame was transmitted from the RSTA, and a corresponding ISTA dialog token of the ISTA dialog tokens.

In Example 2, the subject matter of Example 1 includes, wherein the processing circuitry is further configured to: increment each of the ISTA dialog tokens.

In Example 3, the subject matter of Examples 1-2 includes, wherein the UL NDP frames are trigger-based (TB) physical layer (PHY) protocol data unit (PPDUs)(UL NDP TB PPDUs).

In Example 4, the subject matter of Examples 1-3 includes, wherein the RUs indicate different spatial streams for the ISTAs.

In Example 5, the subject matter of Examples 1-4 includes, wherein the TF is a first TF and the RUs are first RUs, and wherein the processing circuitry is further configured to: encode a second TF for transmission to the ISTAs, the second TF indicating second RUs for the ISTAs to transmit a clear-to-send (CTS) to self-frames to request to participate in the ranging measurement, wherein the second RUs comprise orthogonal frequency division multi-access (OFDMA) RUs; decode the CTS to self-frames; and determine which ISTAs to include in the ranging measurement based on which ISTAs transmitted a CTS to self-frame of the CTS to self-frames.

In Example 6, the subject matter of Examples 1-5 includes, wherein the measurement exchange comprises the TF, the UL NDPs, the NDPA frame, the DL NDPs, and the RSTA to ISTA LMRs.

In Example 7, the subject matter of Examples 1-6 includes, wherein the processing circuitry is further configured to: decode ISTA to RSTA LMRs from the ISTAs, wherein the ISTA to RSTA LMRs comprise indications of a time of arrival when a corresponding DL NDP frame of the DL NDP frames was received at a corresponding ISTA, an indication of a time of departure when a corresponding UL NDP frame was transmitted from the ISTA, and a corresponding ISTA dialog token of the ISTA.

In Example 8, the subject matter of Examples 1-7 includes, wherein the processing circuitry is further configured to: increment each of the ISTA dialog tokens by adding one to each of the ISTA dialog tokens mod a largest value of the ISTA dialog tokens plus one.

In Example 9, the subject matter of Examples 1-8 includes, wherein the processing circuitry is further configured to: contend for a wireless medium; and encode the TF to further comprise a duration subfield, the duration subfield indicating a duration, the duration based on a time when the RSTA to ISTA LMRs is to be finished being transmitted.

In Example 10, the subject matter of Examples 1-9 includes, wherein the corresponding ISTA dialog token of the ISTA dialog tokens is encoded in a dialog token subfield.

In Example 11, the subject matter of Examples 1-10 includes, synthesizer, the synthesizer circuitry configured to generate an output frequency for use by the mixer circuitry, wherein the processing circuitry is configured to decode the baseband signals, the baseband signals including the UL NDP frames.

In Example 12, the subject matter of Examples 1-11 includes, mixer circuitry to down-convert RF signals to baseband signals; and synthesizer circuitry, the synthesizer circuitry comprising a delta-sigma synthesizer, the synthesizer circuitry configured to generate an output frequency for use by the mixer circuitry, wherein the processing circuitry is configured to decode the baseband signals, the baseband signals including the UL NDP frames.

In Example 13, the subject matter of Examples 1-12 includes, transceiver circuitry coupled to the processing circuitry; and, one or more antennas coupled to the transceiver circuitry, and wherein the memory is configured to store the TF.

Example 14 is a non-transitory computer-readable storage medium that stores instructions for execution by one or more processors of an apparatus of an responding station (RSTA), the instructions to configure the one or more processors to: encode a trigger frame (TF) for transmission to initiating stations (ISTAs), the TF indicating resource units (RUs) for the ISTAs to transmit uplink (UL) null-data packets (NDPs) frames to the RSTA, wherein the TF comprises a trigger type subfield and a ranging trigger subtype subfield, the trigger type subfield indicating a trigger frame variant of ranging and the ranging trigger subtype subfield indicating sounding; decode the UL NDP frames from the ISTAs in accordance with the RUs; encode a NDP announcement (NDPA) frame, the NDPA frame comprising indications of the ISTAs and spatial streams for downlink (DL) NDP frames to be transmitted to the ISTAs, wherein the TF or the NDPA frame comprises ISTA dialog tokens, the ISTA dialog tokens indicating a number of a measurement exchange for a corresponding ISTA; configure the RSTA to transmit the DL NDP frames in accordance with the spatial streams; and encode RSTA to ISTA location measurement report (LMRs) for the ISTAs, wherein the RSTA to ISTA LMRs comprise indications of a time of arrival when a corresponding UL NDP frame of the UL NDP frames was received at the RSTA, an indication of a time of departure when a corresponding DL NDP frame was transmitted from the RSTA, and a corresponding ISTA dialog token of the ISTA dialog tokens.

In Example 15, the subject matter of Example 14 includes, wherein the instructions further configure the one or more processors to: increment each of the ISTA dialog tokens.

Example 16 is an apparatus of an initiating station (ISTA), the apparatus comprising memory; and processing circuitry coupled to the memory, the processing circuitry configured to: decode a trigger frame (TF) for transmission to initiating stations (ISTAs), the TF indicating resource units (RUs) for the ISTAs to transmit uplink (UL) null-data packets (NDPs) frames to a responding station (RSTA), wherein the TF comprises a trigger type subfield and a ranging trigger subtype subfield, the trigger type subfield indicating a trigger frame variant of ranging and the ranging trigger subtype subfield indicating sounding; in response to the TF indicating the ISTA is to respond, encode a UL NDP frame of the UL NDP frames in accordance with a corresponding RU of the RUs; decode a NDP announcement (NDPA) frame, the NDPA frame comprising indications of the ISTAs and spatial streams for downlink (DL) NDP frames to be transmitted to the ISTAs, wherein the TF or the NDPA frame comprises STA dialog tokens including a first STA dialog token of the ISTA, the first ISTA dialog token of the ISTA indicating a number of a measurement exchanges for the ISTA; decode the DL NDP frames in accordance with the spatial streams; and decode a RSTA to ISTA location measurement report (LMR) for the ISTA, wherein the RSTA to ISTA LMR comprises an indication of a time of arrival when the UL NDP frame was received at the RSTA, an indication of a time of departure when the DL NDP frame was transmitted from the RSTA, and a second ISTA dialog token of the ISTA.

In Example 17, the subject matter of Example 16 includes, wherein the processing circuitry is further configured to: in response to the first ISTA dialog token indicating a different number as the second ISTA dialog token, determine there was an error.

In Example 18, the subject matter of Examples 16-17 includes, wherein the UL NDP frames are trigger-based (TB) physical layer (PHY) protocol data unit (PPDUsxUL NDP TB PPDUs). In Example 19, the subject matter of Examples 16-18 includes, wherein the RUs indicate different spatial streams for the ISTAs.

In Example 20, the subject matter of Examples 16-19 includes, transceiver circuitry coupled to the processing circuitry; and, one or more antennas coupled to the transceiver circuitry, and wherein the memory is configured to store the TF.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20. Example 23 is a system to implement of any of Examples 1-20. Example 24 is a method to implement of any of Examples 1-20.

Example 25 is a non-transitory computer-readable storage medium that stores instructions for execution by one or more processors of an apparatus of an initiating station (ISTA), the instructions to configure the one or more processors to: encode for transmission a null data packet (NDP) announcement (NDPA) frame, the NDPA frame comprising an identification of a responding station (RSTA), an indication of spatial streams for the ISTA to transmit a first initiating to responding (I2R) NDP frame to the RSTA, an indication of an I2R NDP TX power, and an indication of a responding to initiating (R2I) NDP target receive signal strength indication (RSSI), the R2I NDP target RSSI indicating to the RSTA a target RSSI for a R2I NDP frame; configure the ISTA to transmit the first I2R NDP frame using the I2R NDP TX power and in accordance with the spatial streams; decode the R2I NDP frame from the RSTA; and decode a location measurement report (LMR) from the RSTA, the LMR comprising an indication of a I2R NDP target RSSI, and an indication of a R2I NDP TX power, the R2I NDP TX power indicating the TX power used by the RSTA to transmit the R2I NDP frame, and the I2R NDP target RSSI indicating to the ISTA a target RSSI for a second I2R NDP frame.

In Example 26, the subject matter of Example 25 includes wherein the NDPA frame is a first NDPA frame and the I2R NDP TX power is a first I2R NDP TX power, and wherein the instructions further configure the one or more processors to: determine a RSSI of the R2I NDP frame from received signals of the R2I NDP frame; determine a path loss between the ISTA and the RSTA based on the determined RSSI and the R2I NDP TX power; and adjust a second I2R NDP TX power based on the path loss and the I2R NDP target RSSI.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for an initiating station (ISTA), the apparatus comprising: memory; and processing circuitry coupled to the memory, the processing circuitry configured to:
    encode for transmission a ranging null data packet (NDP) announcement frame,
    the NDP announcement frame comprising a receiver address (RA), the RA indicating an identification of a responding station (RSTA), an ISTA to RSTA (I2R) NDP transmit (TX) power subfield, the I2R NDP TX power subfield indicating a first power to be used to transmit an I2R NDP, and a RSTA to STA (R2I) NDP target receive signal strength indication (RSSI) subfield, the R2I NDP target RSSI subfield indicating a preferred receive signal power for a R2I NDP frame to be transmitted by the RSTA;
    configure the ISTA to transmit the I2R NDP frame in accordance with the first power indicated in the I2R NDP power subfield;
    decode the R2I NDP frame sent frame the RSTA in response to the I2R NDP frame; and
    decode a location measurement report (LMR) frame sent from the RSTA after the R2I NDP, the LMR frame comprising a R2I NDP TX power field, the R2I NDP TX power field indicating a second power used to transmit the R2I NDP frame, and an I2R NDP target RSSI field, the I2R NDP target RSSI field indicating a preferred receive signal power for I2R NDPs to be transmitted by the ISTA.

2. The apparatus of claim 1 wherein the I2R NDP TX power subfield indicates a value in the range of 0 to 60 indicating 20 dBm to 40 dBm.

3. The apparatus of claim 1, wherein the configure the NIA to transmit the I2R NDP frame further comprises:
    configure the ISTA to transmit, a short interframe space (SIFS) after transmitting the ranging NDP announcement frame, the I2R NDP frame in accordance with the first power indicated in the I2R NDP power subfield.

4. The apparatus of claim 1 wherein the R2I NDP target RSSI subfield indicates a value in the range of 0 to 90 indicating a target RSSI of −110 plus the value.

5. The apparatus of claim 1 wherein the NDP announcement frame further comprises a station (STA) information (info) field, and wherein the STA info field comprises the I2R NDP power subfield and the R2I NDP target RSSI subfield.

6. The apparatus of claim 5 wherein the STA info field further comprises an association identification (AID) subfield, and wherein the processing circuitry is further configured to:
    encode the AID subfield with a value of 2046 to indicate the STA info field comprises the I2R NDP power subfield and the R2I NDP target RSSI subfield.

7. The apparatus of claim 1 wherein the processing circuitry is further configured to:
    before the encode for transmission the NDP announcement frame, encode a frame comprising a ranging parameter element, the ranging parameter element comprising an indication that power control is supported by the ISTA.

8. The apparatus of claim 1 wherein the NDP announcement frame is a first NDP announcement frame wherein the processing circuitry is further configured to:
    determine a RSSI of the R2I NDP frame from received signals of the R2I NDP frame;
    determine a path loss between the ISTA and the RSTA based on the determined RSSI and the second power; and
    determine a third power for the ISTA to transmit the I2R NDP frame based on the path loss and the preferred receive signal power for I2R NDPs.

9. The apparatus of claim 1 wherein the NDP announcement frame further comprises a spatial streams subfield, the spatial streams subfield indicating spatial streams for the ISTA to transmit the I2R NDP frame to the RSTA.

10. The apparatus of claim 1 wherein the LMR further comprises a time of arrival (ToA) and a time of departure (ToD), the ToA indicating a time when the I2R NDP frame arrived at an antenna of the RSTA, and the ToD indicating a time when the R2I NDP frame was transmitted by the RSTA.

11. The apparatus of claim 1 further comprising: mixer circuitry to downconvert RF signals to baseband signals; and synthesizer circuitry, the synthesizer circuitry comprising one of a fractional-N synthesizer or a fractional N/N+1 synthesizer, the synthesizer circuitry configured to generate an output frequency for use by the mixer circuitry, wherein the processing circuitry is configured to decode the baseband signals, the baseband signals including the R2I NDP frame.

12. The apparatus of claim 1 further comprising: mixer circuitry to down-convert RF signals to baseband signals; and synthesizer circuitry, the synthesizer circuitry comprising a delta-sigma synthesizer, the synthesizer circuitry configured to generate an output frequency for use by the mixer circuitry, wherein the processing circuitry is configured to decode the baseband signals, the baseband signals including the R2I NDP frame.

13. The apparatus of claim 1, further comprising: transceiver circuitry coupled to the processing circuitry; and, one or more antennas coupled to the transceiver circuitry, and wherein the memory is configured to store the NDP announcement frame.

14. A method performed on an apparatus for an initiating station (ISTA), the method comprising:
   encoding for transmission a ranging null data packet (NDP) announcement frame, the NDP announcement frame comprising a receiver address (RA), the RA indicating an identification of a responding station (RSTA), an ISTA to RSTA (I2R) NDP transmit (TX) power subfield, the I2R NDP TX power subfield indicating a first power to be used to transmit an I2R NDP, and a RSTA to ISTA (R2I) NDP target receive signal strength indication (RSSI) subfield, the R2I NDP target RSSI subfield indicating a preferred receive signal power for a R2I NDP frame to be transmitted by the RSTA;
   configuring the ISTA to transmit the I2R NDP frame in accordance with the first power indicated in the I2R NDP power subfield;
   decoding the R2I NDP frame sent from the RSTA in response to the I2R NDP frame; and
   decoding a location measurement report (LMR) frame sent from the RSTA after the R2I NDP, the LMR frame comprising a R2I NDP TX power field, the R2I NDP TX power field indicating a second power used to transmit the R2I NDP frame, and an I2R NDP target RSSI field, the I2R NDP target RSSI field indicating a preferred receive signal power for 12R NDPs to be transmitted by the ISTA.

15. The method of claim 14 wherein the I2R NDP TX power subfield indicates a value in the range of 0 to 60 indicating 20 dBm to 40 dBm.

16. A non-transitory computer-readable storage medium that stores instructions for execution by one or more processors of an apparatus for an initiating station (ISTA), the instructions to configure the one or more processors to:
   encode for transmission a ranging null data packet (NDP) announcement frame, the NDP announcement frame comprising a receiver address (RA), the RA indicating an identification of a responding station (RSTA), an ISTA to RSTA (I2R) NDP transmit (TX) power subfield, the I2R NDP TX power subfield indicating a first power to be used to transmit an I2R NDP, and a RSTA to ISTA (R2I) NI)P target receive signal strength indication (RSSI) subfield, the R2I NDP target RSSI subfield indicating a preferred receive signal power for a R2I NDP frame to be transmitted by the RSTA;
   configure the ISTA to transmit the I2R NDP frame in accordance with the first power indicated in the I2R NDP power subfield;
   decode the R2I NDP frame sent from the RSTA in response to the I2R NDP frame; and
   decode a location measurement report (LMR) frame sent from the RSTA after the R2I NDP, the LMR frame comprising a R2I NDP TX power field, the R2I NDP TX power field indicating a second power used to transmit the R2I NDP frame, and an I2R NDP target RSSI field, the I2R NDP target RSSI field indicating a preferred receive signal power for I2R NDPs to be transmitted by the ISTA.

17. The non-transitory computer-readable storage medium of claim 16 wherein the R2I NDP target RSSI subfield indicates a value in the range of 0 to 90 indicating a target RSSI of −110 plus the value.

18. The non-transitory computer-readable storage medium of claim 16 wherein the configure the ISTA to transmit the I2R NDP frame further comprises:
   configure the ISTA to transmit, a short interframe space (SIFS) after transmitting the ranging NDP announcement frame, the I2R NDP frame in accordance with the first power indicated in the I2R NDP power subfield.

19. The non-transitory computer-readable storage medium of claim 16 an I2R NDP target RSSI field indicates a value in the range of 0 to 90 indicating −110 dBm to −20 dBm.

20. The non-transitory computer-readable storage medium of claim 16 wherein the NDP announcement frame further comprises a station (STA) information (info) field, and wherein the STA info field comprises the ER NDP power subfield and the R2I NDP target RSSI subfield.

* * * * *